United States Patent
Katayama

(10) Patent No.: US 8,465,890 B2
(45) Date of Patent: Jun. 18, 2013

(54) ELECTROPHOTOGRAPHIC PHOTOCONDUCTOR AND IMAGE FORMING APPARATUS INCLUDING THE SAME, AND COATING SOLUTION FOR UNDERCOAT LAYER FORMATION IN ELECTROPHOTOGRAPHIC PHOTOCONDUCTOR

(75) Inventor: Satoshi Katayama, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 116 days.

(21) Appl. No.: 13/218,806

(22) Filed: Aug. 26, 2011

(65) Prior Publication Data

US 2012/0051786 A1    Mar. 1, 2012

(30) Foreign Application Priority Data

Aug. 30, 2010    (JP) ................................ 2010-192296

(51) Int. Cl.
    *G03G 5/00*    (2006.01)

(52) U.S. Cl.
    USPC ........................................... 430/65; 399/159

(58) Field of Classification Search
    USPC ........................................... 430/65; 399/159
    See application file for complete search history.

(56) References Cited

U.S. PATENT DOCUMENTS

| | | | |
|---|---|---|---|
| 3,824,099 A | 7/1974 | Champ et al. | |
| 4,036,933 A | 7/1977 | Laufer et al. | |
| 4,123,269 A | 10/1978 | Von Hoene et al. | |
| 4,150,987 A | 4/1979 | Anderson et al. | |
| 4,278,747 A | 7/1981 | Murayama et al. | |
| 4,338,388 A | 7/1982 | Sakai et al. | |
| 4,367,273 A | 1/1983 | Murayama et al. | |
| 4,518,669 A | 5/1985 | Yashiki | |
| 4,859,556 A | 8/1989 | Sasaki | |
| 4,892,949 A | 1/1990 | Sasaki | |
| 4,981,767 A | 1/1991 | Tokura et al. | |
| 5,075,206 A | 12/1991 | Noda et al. | |
| 5,213,929 A | 5/1993 | Takano et al. | |
| 5,298,353 A | 3/1994 | Ohmori | |
| 5,529,869 A | 6/1996 | Nguyen | |
| 5,972,551 A | 10/1999 | Miyauchi | |
| 7,175,956 B2 | 2/2007 | Obata et al. | |
| 2004/0101770 A1 | 5/2004 | Obata et al. | |
| 2004/0202947 A1 | 10/2004 | Wu et al. | |
| 2006/0088778 A1 | 4/2006 | Itami et al. | |
| 2006/0127782 A1 | 6/2006 | Ishida et al. | |

(Continued)

FOREIGN PATENT DOCUMENTS

| | | |
|---|---|---|
| JP | 48-47344 | 7/1973 |
| JP | 52-4188 | 2/1977 |

(Continued)

OTHER PUBLICATIONS

Nitta et al., "New Method of Joining a Polygon Mirror Using a Shrink Fitter", *Japan Hardcopy '96*, 1996, pp. 117-120 (English Translation—partial).

(Continued)

*Primary Examiner* — Mark A Chapman
(74) *Attorney, Agent, or Firm* — Nixon & Vanderhye, P.C.

(57) ABSTRACT

An electrophotographic photoconductor comprising a conductive support, an undercoat layer and a photosensitive layer, the undercoat layer and the photosensitive layer being formed on the conductive support in sequence, wherein the undercoat layer contains a binder resin, titanium oxide particles surface-treated with at least anhydrous silicon dioxide and titanium oxide particles surface-treated with at least hydrous silicon dioxide.

13 Claims, 4 Drawing Sheets

U.S. PATENT DOCUMENTS

| | | |
|---|---|---|
| 2006/0222979 A1 | 10/2006 | Ishida et al. |
| 2007/0026334 A1 | 2/2007 | Morita et al. |
| 2007/0298259 A1 | 12/2007 | Matsumoto |
| 2008/0050666 A1 | 2/2008 | Otsubo |
| 2008/0057427 A1 | 3/2008 | Sakimura et al. |
| 2008/0305426 A1 | 12/2008 | Kurimoto |
| 2009/0068577 A1 | 3/2009 | Ohta et al. |
| 2009/0245868 A1 | 10/2009 | Fukushima et al. |
| 2011/0020739 A1 | 1/2011 | Nakamura et al. |
| 2011/0104600 A1 | 5/2011 | Kurauchi et al. |
| 2012/0003577 A1 | 1/2012 | Katayama et al. |
| 2012/0020739 A1 | 1/2012 | Lyngberg et al. |
| 2012/0051786 A1 | 3/2012 | Katayama |

FOREIGN PATENT DOCUMENTS

| | | |
|---|---|---|
| JP | 54-150128 | 11/1979 |
| JP | 54-151955 | 11/1979 |
| JP | 55-52063 | 4/1980 |
| JP | 55-42380 | 10/1980 |
| JP | 56-52757 | 5/1981 |
| JP | 58-32372 | 7/1983 |
| JP | 58-198043 | 11/1983 |
| JP | 6-43674 | 2/1984 |
| JP | 59-93453 | 5/1984 |
| JP | 2-51162 | 2/1990 |
| JP | 2-190862 | 7/1990 |
| JP | 4-172362 | 6/1992 |
| JP | 4-229872 | 8/1992 |
| JP | 5-134437 | 5/1993 |
| JP | 6-39575 | 5/1994 |
| JP | 7-48324 | 2/1995 |
| JP | 7-134430 | 5/1995 |
| JP | 7-91486 | 10/1995 |
| JP | 10-69107 | 3/1998 |
| JP | 2754739 | 3/1998 |
| JP | 2780295 | 5/1998 |
| JP | 10-237347 | 9/1998 |
| JP | 3005052 | 11/1999 |
| JP | 2000-242016 | 9/2000 |
| JP | 2000-292958 | 10/2000 |
| JP | 2002-131952 | 5/2002 |
| JP | 2002-131954 | 5/2002 |
| JP | 2002-365820 | 12/2002 |
| JP | 2003-066639 | 3/2003 |
| JP | 2004-212888 | 7/2004 |
| JP | 2007-180042 | 7/2007 |
| JP | 2007-248560 | 9/2007 |
| JP | 2008-076808 | 4/2008 |
| JP | 2008-250083 | 10/2008 |
| JP | 2008-299020 | 12/2008 |
| JP | 2009-15112 | 1/2009 |
| WO | WO 2010/106893 A1 | 9/2010 |

OTHER PUBLICATIONS

Chemical Abstracts 138:47243 of JP 2002-365820, 23/28/2002.

Translation of JP 2002-365820.

English language machine translation of JP 2002-365820 (Dec. 2002).

English language machine translation of JP 2010-140001 (Jun. 2010).

Office Action dated Oct. 25, 2012, issued in connection with U.S. Appl. No. 12/914,151.

International Search Report for PCT/JP2010/053126 mailed Mar. 23, 2010.

(a)

(b)

ELECTROPHOTOGRAPHIC PHOTOCONDUCTOR AND IMAGE FORMING APPARATUS INCLUDING THE SAME, AND COATING SOLUTION FOR UNDERCOAT LAYER FORMATION IN ELECTROPHOTOGRAPHIC PHOTOCONDUCTOR

CROSS-REFERENCE TO RELATED APPLICATION

This application is related to Japanese Patent Application No. 2010-192296 filed on 30 Aug., 2010, whose priority is claimed under 35 USC §119, and the disclosure of which is incorporated by reference in its entirety.

BACKGROUND OF THE INVENTION

1. Field of the Invention

The present invention relates to an electrophotographic photoconductor. More particularly, the present invention relates to an electrophotographic photoconductor provided with an undercoat layer (interlayer) between a conductive support and a photosensitive layer, and an image forming apparatus, and a coating solution for undercoat layer formation in the electrophotographic photoconductor.

2. Description of the Related Art

Generally, an electrophotographic process using a photoconductor having photoconductivity is one of information recording techniques utilizing a photoconduction phenomenon of the photoconductor.

According to the process, a surface of the photoconductor is first charged uniformly with electricity by corona discharge in a dark place, and then image exposure is carried out to allow an exposed portion to selectively discharge, thereby to form an electrostatic image on an unexposed portion. Subsequently, colored and charged fine particles (toner) are attached to the latent image by electrostatic attracting force to form a visual image, thereby forming an image.

In such a series of processes, it is demanded that the photoconductor have the following fundamental characteristics:
1) The photoconductor can be uniformly charged up to an appropriate potential in a dark place.
2) The photoconductor has high charge-retaining ability and is reduced in discharge in a dark place.
3) The photoconductor is excellent in photosensitivity and rapidly discharges by irradiation with light.

Furthermore, it is demanded that the photoconductor have the following characteristics in terms of greater stability and durability, for example, charges on the surface of the photoconductor can be removed easily, leaving reduced residual potential; the photoconductor has mechanical strength and excellent flexibility; the photoconductor is not varied in electric characteristics, in particular, in chargeability, photosensitivity and residual potential when used repeatedly; and the photoconductor has tolerance for heat, light, temperature, humidity and ozone degradation.

Since recent electrophotographic photoconductors that have been put into practical use are each provided with a photosensitive layer formed on a conductive support, carrier injection from the conductive support is likely to occur to cause surface charges to disappear or decrease microscopically, thereby generating an image defect.

To prevent such an image defect, to cover defects on the surface of the conductive support, to improve chargeability, to enhance adhesion of the photosensitive layer and to improve coatability, an undercoat layer (interlayer) is provided between the conductive support and the photosensitive layer.

Conventionally, various resin materials and resin materials containing inorganic compound particles such as titanium oxide powders have been considered as the undercoat layer.

As the materials to use for forming the undercoat layer with a resin monolayer, resin materials such as polyethylenes, polypropylenes, polystyrenes, acryl resins, vinyl chloride resins, vinyl acetate resins, polyurethane resins, epoxy resins, polyester resins, melamine resins, silicon resins, polyvinyl butyral resins and polyamide resins, copolymer resins including two or more types of these repeat units, and further, casein, gelatin, polyvinyl alcohols and ethyl cellulose and the like are known, among which polyamide resins are particularly preferable.

However, with an electrophotographic photoconductor provided with a monolayer of a resin such as a polyamide as the undercoat layer, the residual potential is greatly accumulated, the sensitivity decreases, and image fogging is generated. Such a tendency is significant particularly under a low-humidity environment.

In order to prevent generation of image defects attributed to the conductive support and improve the residual potential, therefore, there have been proposed an undercoat layer containing surface-untreated titanium oxide powders (Japanese Unexamined Patent Publication No. SHO 56 (1981)-52757, an undercoat layer containing titanium oxide fine particles coated with alumina or the like to improve the dispersibility of titanium oxide powders (Japanese Unexamined Patent Publication No. SHO 59 (1984)-93453, an undercoat layer containing metal oxide particles surface-treated with a titanate coupling agent (Japanese Unexamined Patent Publication No. HEI 4 (1992)-172362) and an undercoat layer containing metal oxide particles surface-treated with a silane compound (Japanese Unexamined Patent Publication No. HEI 4 (1992)-229872). When a photoconductor is used for a prolonged period of time, however, it is impossible to avoid the influence of environmental variation on sensitivity and images. An electrophotographic photoconductor having characteristics further improved in terms of durability has been therefore desired.

SUMMARY OF THE INVENTION

It is an object of the present invention to inhibit deterioration in the sensitivity of a photoconductor due to temperature and humidity and to provide: an electrophotographic photoconductor that is less prone to sensitivity variation due to repeated use and free from image defects and fogging, an image forming apparatus including the electrophotographic photoconductor, and a coating solution for undercoat layer formation in the electrophotographic photoconductor.

The inventor of the present invention has found that when the undercoat layer contains both titanium oxide particles surface-treated with anhydrous silicon dioxide and titanium oxide particles surface-treated with hydrous silicon dioxide, the dispersibility in the undercoat layer can be improved, generation of aggregates can be prevented, the coating film can be flat and have a uniformly maintained resistance, and potential characteristics and image properties of the photoconductor that are less subject to adverse effect due to environmental variation and stable under various environments can be obtained.

Specifically, the inventor of the present invention has made intensive studies and efforts and, as a result, found that the above-described object can be achieved by an electrophotographic photoconductor having an undercoat layer containing a binder resin, and both titanium oxide particles surface-treated with anhydrous silicon dioxide and titanium oxide particles surface-treated with at least hydrous silicon dioxide to reach completion of the present invention.

According to an aspect of the present invention, therefore, there is provided an electrophotographic photoconductor comprising a conductive support, an undercoat layer and a photosensitive layer, the undercoat layer and the photosensitive layer being formed on the conductive support in sequence, wherein the undercoat layer contains a binder resin, titanium oxide particles surface-treated with at least anhydrous silicon dioxide and titanium oxide particles surface-treated with at least hydrous silicon dioxide.

According to another aspect of the present invention, there is provided an electrophotographic photoconductor, wherein the titanium oxide particles surface-treated with anhydrous silicon dioxide and the titanium oxide particles surface-treated with hydrous silicon dioxide are contained at a ratio by weight of 80/20 to 30/70.

According to another aspect of the present invention, there is provided an electrophotographic photoconductor, wherein the titanium oxide particles surface-treated with hydrous silicon dioxide are titanium oxide particles surface-treated with hydrous silicon dioxide and aluminum hydroxide.

There is provided an electrophotographic photoconductor, wherein the titanium oxide particles surface-treated with hydrous silicon dioxide are those surface-treated with a mixture of hydrous silicon dioxide and aluminum hydroxide mixed at a ratio by weight of 10/90 to 90/10.

According to another aspect of the present invention, there is provided an electrophotographic photoconductor, wherein the photosensitive layer contains a phthalocyanine as a charge generation material.

According to another aspect of the present invention, there is provided an electrophotographic photoconductor, wherein the photosensitive layer contains, as a charge generation material, a phthalocyanine selected from a τ type metal-free phthalocyanine; a titanylphthalocyanine of a crystal type having a maximum diffraction peak in an X-ray diffraction spectrum at a Bragg angle (2θ±0.2°) of 27.3° and a titanylphthalocyanine of a crystal type at least having diffraction peaks in an X-ray diffraction spectrum at Bragg angles (2θ±0.2°) of 7.3°, 9.4°, 9.7° and 27.3°, among which the diffraction peaks at 9.4° and 9.7° are both clear branch peaks and greater than the diffraction peak at 27.3°, and the diffraction peak at 9.4° is a maximum diffraction peak.

According to another aspect of the present invention, there is provided an electrophotographic photoconductor, wherein the titanium oxide particles have an average primary particle diameter of 20 nm to 100 nm.

According to another aspect of the present invention, there is provided an electrophotographic photoconductor, wherein the titanium oxide particles surface-treated with anhydrous silicon dioxide and the titanium oxide particles surface-treated with at least hydrous silicon dioxide are used at a ratio by weight of 80/20 to 30/70, the titanium oxide particles are contained in the undercoat layer at a ratio by weight of 10/90 to 95/5 with respect to the binder resin, and the binder resin is a polyamide resin.

According to another aspect of the present invention, there is provided an electrophotographic photoconductor, wherein the undercoat layer has a film thickness of 0.05 μm to 5 μm, the photosensitive layer is a multilayer photosensitive layer comprising a charge generation layer and a charge transfer layer, the charge generation layer having a film thickness of 0.05 μm to 5 μm.

According to another aspect of the present invention, there is provided an image forming apparatus including an electrophotographic photoconductor, the electrophotographic photoconductor comprising a conductive support; an undercoat layer; and a photosensitive layer, the undercoat layer and the photosensitive layer being formed on the conductive support in sequence, the undercoat layer containing a binder resin, titanium oxide particles surface-treated with anhydrous silicon dioxide and titanium oxide particles surface-treated with at least hydrous silicon dioxide, the photosensitive layer containing, as a charge generation material, a phthalocyanine selected from a τ type metal-free phthalocyanine; a titanylphthalocyanine of a crystal type having a maximum diffraction peak in an X-ray diffraction spectrum at a Bragg angle (2θ±0.2°) of 27.3° and a titanylphthalocyanine of a crystal type at least having diffraction peaks in an X-ray diffraction spectrum at Bragg angles (2θ±0.2°) of 7.3°, 9.4°, 9.7° and 27.3°, among which the diffraction peaks at 9.4° and 9.7° are both clear branch peaks and greater than the diffraction peak at 27.3°, and the diffraction peak at 9.4° is a maximum diffraction peak.

According to another aspect of the present invention, there is provided a coating solution for undercoat layer formation for producing an electrophotographic photoconductor, comprising a conductive support, an undercoat layer, and a photosensitive layer, the undercoat layer and the photosensitive layer being formed on the conductive support in sequence, the coating solution containing a binder resin, titanium oxide particles surface-treated with at least anhydrous silicon dioxide and titanium oxide particles surface-treated with at least hydrous silicon dioxide.

According to another aspect of the present invention, there is provided a coating solution, containing the titanium oxide particles surface-treated with anhydrous silicon dioxide and the titanium oxide particles surface-treated with hydrous silicon dioxide at a ratio by weight of 80/20 to 30/70.

According to another aspect of the present invention, there is provided a coating solution, wherein the titanium oxide particles surface-treated with hydrous silicon dioxide comprise titanium oxide particles surface-treated with hydrous silicon dioxide and aluminum hydroxide.

There is further provided a coating solution, wherein the titanium oxide particles surface-treated with hydrous silicon dioxide are those surface-treated with a mixture of hydrous silicon dioxide and aluminum hydroxide mixed at a ratio by weight of 10/90 to 90/10.

The electrophotographic photoconductor of the present invention can inhibit fluctuation of microscopical characteristics of the photoconductor, in particular, the sensitivity and the residual potential, preventing generation of an image defect and image fogging.

The present invention can provide an electrophotographic photoconductor having very stable environmental properties, preventing deterioration in image properties even in long-term and repeated use.

In addition, according to the present invention, very good image properties can be obtained even when the photoconductor is mounted in an apparatus that forms images by a reverse developing process to inhibit charge injection from the conductive support.

In other words, deterioration in chargeability of the monolayer photosensitive layer or the multilayer photosensitive layer is limited by the undercoat layer, and therefore reduction in surface charges on a part other than the parts to be eliminated by exposure is limited, thereby preventing occurrence of image defects such as fogging.

In particular, it is possible to prevent fogging of images called black dots, that is, fine black dots of toner formed on a white background in image formation by a reverse developing process.

BRIEF DESCRIPTION OF THE DRAWINGS

FIG. 2 (a) is a drawing illustrating a multilayer type photoconductor comprising three layers of an interlayer, a charge generation layer and a charge transfer layer, and FIG. 2 (b) is a drawing illustrating a monolayer type photoconductor comprising an interlayer and a photosensitive layer;

DESCRIPTION OF THE PREFERRED EMBODIMENTS

Figure 1:
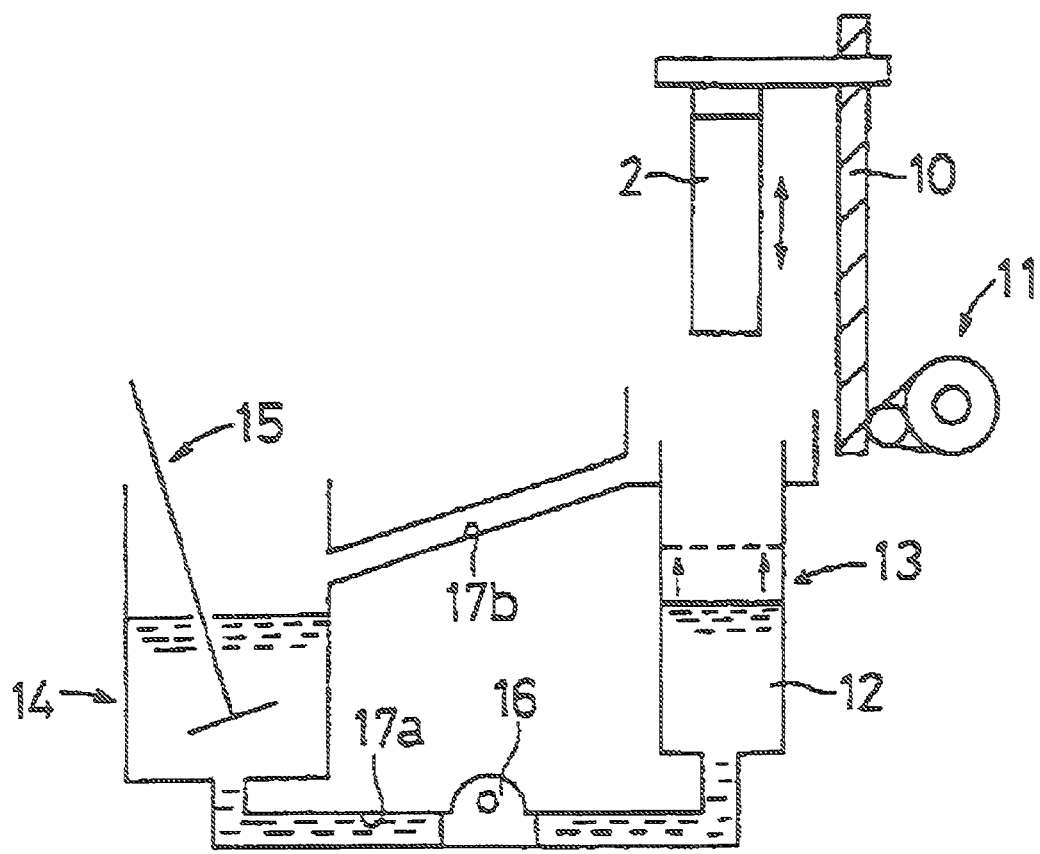
FIG. 1 is a drawing illustrating a dipping coating apparatus.

The term "anhydrous silicon dioxide" used in the present invention means silicon dioxide having no water of crystallization.

The term "hydrous silicon dioxide" used in the present invention means that the silicon dioxide is a hydrate, that is, the silicon dioxide has water of crystallization.

Hereinafter, the present invention will be described in detail with reference to the drawings.

[Conductive Support 2]

The conductive support functions as an electrode of the photoconductor and as a support member for each layer.

The constituent material of the conductive support is not particularly limited as long as it is used in the relevant art.

Specific examples of the constituent material include metal and alloy materials such as aluminum, aluminum alloys, copper, brass, zinc, nickel, stainless steel, chromium, molybdenum, vanadium, indium, titanium, gold and platinum; and materials obtained by laying a metal foil, depositing a metal material or an alloy material, or depositing or applying a layer of a conductive compound such as a conductive polymer, tin oxide, indium oxide and carbon black on a surface of a substrate made of hard paper, glass, or a polymer material such as polyethylene terephthalate, polyamide, polyester, polyoxymethylene, polystyrene, cellulose, and polylactic acid.

Examples of the shape of the conductive support include a sheet form, a cylinder form, a columnar form and an endless belt (seamless belt) form.

As needed, the surface of the conductive support may be processed by anodic oxidation coating treatment, surface treatment using chemicals or hot water, coloring treatment or irregular reflection treatment such as surface roughing to the extent that the image quality is not adversely affected.

The irregular reflection treatment is particularly effective when the photoconductor of the present invention is used in an electrophotographic process using a laser as an exposure light source.

That is, since the wavelengths of laser light are uniform in an electrophotographic process using a laser as an exposure light source, laser light reflected on the surface of the photoconductor may interfere with the laser light reflected on the inside of the photoconductor, resulting in appearance of interference fringes on an image and generation of an image defect. In this respect, the image defect that may be caused by the interference of laser light with uniform wavelengths can be prevented by the surface of the conductive support subjected to the irregular reflection treatment.

[Coating Solution for Undercoat Layer Formation]

In the course of development of a photoconductor having a longer life, the inventor of the present invention has made intensive studies and, as a result, found that when the undercoat contains a binder resin, titanium oxide coated with anhydrous silicon dioxide and titanium oxide coated with hydrous silicon dioxide, preferably titanium oxide coated with a mixture of hydrous silicon dioxide and aluminum hydroxide, it is possible to prevent aggregation of the titanium oxide even when dispersion process is prolonged and to obtain a coating solution that is stable even after storage for six months, which is longer than conventional storage for one month.

The inventors of the present invention has also found that when the undercoat layer is formed with the above-described coating solution for undercoat layer formation to produce an electrophotographic photoconductor, the influence of humidity is reduced to obtain excellent images free from black dots and fogging under various environments, and an electrophotographic photoconductor having a longer life and improved stability against repeated use.

Containing both the two kinds of titanium oxide particles, the coating solution for undercoat layer formation can prevent aggregation of the titanium oxides even when the dispersion process is prolonged. As a result, it is possible to obtain a coating solution that is stable even after storage for six months, which is longer than conventional storage for one month, and to obtain an electrophotographic photoconductor provided with a very uniform coating solution for undercoat layer formation.

This is supposed because use of the combination of silicon dioxide having water of crystallization and anhydrous silicon dioxide having no water of crystallization stabilizes the carrier transfer ability in the undercoat layer even under low-temperature and low-humidity, and high-temperature and high-humidity environments to enable carrier transfer that is stable and resistant to environmental variation. However, detailed mechanism thereof has not been clarified yet.

It is also supposed that the above-described effect is enhanced by the combination use of aluminum hydroxide.

Binder Resin for Undercoat Layer

For the binder resin to be contained in the undercoat layer, the same materials as in the case of forming the undercoat layer with a resin monolayer may be used. Known examples thereof include polyethylene resins, polypropylene resins, polystyrene resins, acrylic resins, vinyl chloride resins, vinyl acetate resins, polyurethane resins, epoxy resins, polyester resins, melamine resins, silicon resins, butyral resins, polyamide resins, copolymer resins including two or more types of these repeat units, casein, gelatin, polyvinyl alcohols, and ethylcellulose. Out of these resins, polyamide resins, butyral resins and vinyl acetate resins, which are alcohol-soluble, are preferable, and polyamide resins are particularly preferable.

This is because, as characteristics of the binder resin, the polyamide resins, contained in the undercoat layer, do not dissolve in or swell with a solvent to be used when the photosensitive layer is formed on the undercoat layer, have excellent adhesion to the conductive support and flexibility, and have good affinity for the metal oxides contained in the undercoat layer to allow the metal oxide particles to well disperse and allow excellent storage stability of the dispersion liquid.

Out of the polyamide resins, alcohol-soluble nylon resins can be suitably used.

Examples of the alcohol-soluble nylon resins include so-called copolymer nylons obtained by copolymerizing, for example, 6-nylon, 6,6-nylon, 6,10-nylon, 11-nylon or 12-nylon, and resins obtained by chemically modifying nylon such as N-alkoxymethyl modified nylon and N-alkoxyethyl modified nylon.

For the dispersion process of the coating solution for undercoat layer formation, ultrasonic dispersers using no dispersion medium or dispersers using a dispersion medium such as a ball mill, a bead mill and a paint conditioner may be used. Out of them, the dispersers using a dispersion medium is preferable, with which the inorganic compound is put into a solution of the binder resin dissolved in an organic solvent, and the inorganic compound can be dispersed by the action of a strong force given by the disperser via the dispersion medium.

Examples of the material of the dispersion medium include glass, zircon, alumina and titanium. In particular, zirconia and titania are preferably used as having higher abrasion resistance.

The shape and size of the dispersion medium are not limited and examples thereof include the form of a bead having a size of approximately 0.3 mm to 5 mm and the form of a ball having a size of approximately 3 cm.

It is not preferable to use glass as the material of the dispersion medium, because in this case, the viscosity of the dispersion liquid increases to reduce the storage stability.

This is considered based on the fact that, when the metal oxide fine particles used in the present invention are dispersed, the strong force given by the disperser is used not only as energy for dispersing the metal oxide fine particles but also as energy for abrading the dispersion medium itself so that the material of the dispersion medium generated due to the abrasion of the dispersion medium is mixed in the coating dispersion to deteriorate the coating dispersion in dispersibility and storage stability, having some effects on the coatability and the film quality of the undercoat layer in the formation of the undercoat layer of the electrophotographic photoconductor.

Solvent of Coating Solution for Undercoat Layer Formation

General organic solvents can be used as the organic solvent for the dispersion liquid for forming the undercoat layer of the electrophotographic photoconductor of the present invention. When an alcohol-soluble nylon resin, which is preferable as the binder resin, is used, organic solvents such as lower alcohols having 1 to 4 carbon atoms are used.

More particularly, the solvent of the coating solution for undercoat layer formation is preferably a lower alcohol selected from the group consisting of methyl alcohol, ethyl alcohol, isopropyl alcohol, n-propyl alcohol, n-butyl alcohol, isobutyl alcohol and t-butyl alcohol.

The coating solution for undercoat layer formation is prepared by dispersing the polyamide resin and the titanium oxide particles in the lower alcohol, and the undercoat layer is formed by applying and drying the coating solution for undercoat layer formation on the conductive support.

The respective amounts of the anhydrous silicon dioxide, the hydrous silicon dioxide and the aluminum hydroxide for coating the surfaces of the titanium oxide particles as used for the surface treatment are preferably 0.1% by weight to 50% by weight with respect to the titanium oxide to use.

When the respective amounts of the anhydrous silicon dioxide, the hydrous silicon dioxide and the aluminum hydroxide are less than 0.1% by weight, the surfaces of the titanium oxides cannot be coated sufficiently, preventing sufficient production of the effect of the surface treatment.

In addition, it is not preferable that the respective amounts of the anhydrous silicon dioxide, the hydrous silicon dioxide and the aluminum hydroxide are more than 50% by weight, because in this case, excessive anhydrous silicon dioxide, hydrous silicon dioxide and aluminum hydroxide, which are not used for coating the titanium oxides, remain to lessen the effect by the inclusion of the titanium oxide particles so that the effect will be substantially the same as in the case of inclusion of silicon dioxide fine particles and aluminum hydroxide, and therefore the sensitivity of the photoconductor is reduced, and image fogging occurs.

Preferably, the hydrous silicon dioxide and the aluminum hydroxide are used for coating the titanium oxide particles at a ratio by weight of 10/90 to 90/10.

More preferably, the titanium oxide particles surface-treated with anhydrous silicon dioxide and the titanium oxide particles surface-treated with at least hydrous silicon dioxide have a particle diameter of 20 nm to 100 nm.

In the meantime, when organic compounds such as general coupling agents are used for the surface treatment of the titanium oxide particles, the resistivity of the undercoat layer will be so high that the sensitivity variation due to the effect of humidity is reduced, but the sensitivity itself is deteriorated to cause image fogging.

It is not preferable to perform the surface treatment with organic compounds such as silane coupling agents including an alkoxysilane compound; sililating agents obtained by combining atoms of halogens, nitrogen, sulfur, and the like with silicon; titanate coupling agents; and aluminate coupling agents, because in this case, significant image fogging occurs with repeated use.

[Undercoat Layer (May be Referred to as Interlayer) 3]

The undercoat layer can be obtained by applying the above-described coating solution for undercoat layer formation onto the conductive support, and then drying the coating film obtained, for example.

Examples of the method for applying the coating solution for undercoat layer formation include a Baker applicator method, a bar-coater method (for example, wire bar-coater method), a casting method, a spin coating method, a roll method, a blade method, a bead method, a curtain method in the case of sheets; and a spray method, a vertical ring method and a dipping coating method in the case of drums.

As the application method, the most suitable method may be selected in consideration of the physical properties of the coating solution and productivity, and a dipping coating method, a blade coater method and a spray method are particularly preferable.

The present invention is characterized in that the undercoat layer, which is applied and formed on the surface of the conductive support, contains a binder resin, and both titanium oxide particles surface-treated with anhydrous silicon dioxide and titanium oxide particles surface-treated with at least hydrous silicon dioxide.

Preferably, in the present invention, the undercoat layer contains both titanium oxide particles surface-treated with anhydrous silicon dioxide, and titanium oxide particles surface-treated with both hydrous silicon dioxide and aluminum hydroxide.

Preferably, in the present invention, the titanium oxide particles have an average primary particle diameter of 20 nm to 100 nm.

Preferably, in the present invention, the titanium oxide particles surface-treated with anhydrous silicon dioxide and the titanium oxide particles surface-treated with hydrous silicon dioxide are used at a ratio by weight of 80/20 to 30/70.

Preferably, in the present invention, the titanium oxide particles surface-treated with hydrous silicon dioxide are titanium oxide particles surface-treated with hydrous silicon dioxide and aluminum hydroxide.

Preferably, in the present invention, the titanium oxide particles surface-treated with hydrous silicon dioxide are those treated with a mixture of hydrous silicon dioxide and aluminum hydroxide mixed at a ratio by weight of 10/90 to 90/10.

Preferably, in the present invention, the titanium oxide particles are used at a ratio by weight of 10/90 to 95/5 with respect to the binder resin.

Preferably, in the present invention, the binder resin is a polyamide resin.

Preferably, in the present invention, the undercoat layer has a film thickness of 0.05 µm to 5 µm.

The undercoat layer has a function of preventing charges from being injected into a monolayer photosensitive layer or a multilayer photosensitive layer from the conductive support (being a barrier to hole injection).

In other words, deterioration in chargeability of the monolayer photosensitive layer or the multilayer photosensitive layer is limited by the undercoat layer, and therefore reduction in surface charges on a part other than the parts to be eliminated by exposure is limited, thereby preventing occurrence of image defects such as fogging.

In particular, it is possible to prevent fogging of images called black dots, that is, fine black dots of toner formed on a white background in image formation by a reverse developing process.

The undercoat layer that coats the surface of the conductive support can reduce the degree of irregularity, which is a defect of the surface of the conductive support, to uniform the surface, enhance the film-forming characteristic of the monolayer photosensitive layer or the multilayer photosensitive layer, and improve the sticking characteristics (adhesion) between the conductive support and the monolayer photosensitive layer or the multilayer photosensitive layer.

An electrophotographic photoconductor provided with the above-described undercoat layer can prevent an image defect coming from a defect of the conductive support while maintaining predetermined electric characteristics between the conductive support and the photosensitive layer.

In particular, by using, as a charge generation material, an organic material having photosensitivity to a longer wavelength, for example a phthalocyanine pigment to produce the electrophotographic photoconductor provided with the excellent undercoat layer, and by mounting this electrophotographic photoconductor in an image forming apparatus adopting an inverse developing process, the image properties will be excellent, being free from fine black dots on a white background due to decrease or elimination of surface charges in micro areas, which are specific to inverse development.

The electrophotographic photoconductor is characterized in that it comprises a conductive support, an undercoat layer formed on the conductive support, and a photosensitive layer formed on the undercoat layer, and that the undercoat layer has a film thickness of 0.05 µm to 5 µm.

As for a conventional undercoat layer, reduction of the film thickness improves environmental characteristics but reduces adhesion between the conductive support and the photosensitive layer, producing an adverse effect of generation of an image defect attributed to the defect of the conductive support.

On the other hand, increase of the film thickness of the undercoat layer causes reduced sensitivity and degrades environmental characteristics. Thus, the practical film thickness for achieving both reduction of image defects and improvement in the stability of the electric characteristics was limited.

However, the inventor of the present invention has found that when the undercoat layer contains both titanium oxide particles surface-treated with anhydrous silicon dioxide and titanium oxide particles surface-treated with hydrous silicon dioxide, the dispersibility in the undercoat layer can be improved, generation of aggregates can be prevented, the coating film can be flat and have a uniformly maintained resistance, and potential characteristics and image properties of the photoconductor that are less subject to adverse effect due to environmental variation and stable under various environments can be obtained.

The electrophotographic photoconductor of the present invention can inhibit fluctuation of microscopical characteristics of the photoconductor, in particular, the sensitivity and the residual potential, preventing generation of an image defect and image fogging.

The electrophotographic photoconductor is characterized in that the binder resin contained in the undercoat layer is an organic solvent-soluble polyamide resin.

Since the polyamide resin as the binder resin contained in the undercoat layer is easy to match with the metal oxide particles and besides excellent in adhesion with the conductive support, the undercoat layer containing the polyamide resin can maintain the flexibility of the film.

Further, the polyamide resin contained in the formed undercoat layer does not swell with or dissolve in a solvent for a coating solution for photoconductor formation to prevent occurrence of defective and uneven coating in the undercoat layer, and therefore can provide an electrophotographic photoconductor showing excellent image properties.

The crystal type of the titanium oxides may be any of a rutile type, an anatase type and amorphous, or a mixture of two or more of these types. The shape thereof to be used is generally particulate, but may be acicular or dendritic.

The term "acicular" shape, as used herein for the crystal form of an inorganic compound, means a long and narrow form including a bar-like form, a columnar form and a spindle-like form; it does not need to be extremely long and narrow or sharp at an end.

In addition, the present invention is characterized in that both the titanium oxide particles surface-treated with anhydrous silicon dioxide and the titanium oxide particles surface-treated with at least hydrous silicon dioxide have an average primary particle diameter of 20 nm to 100 nm.

The titanium oxides having such an average primary particle diameter exert good dispersibility and therefore can be dispersed in the binder resin uniformly.

The average primary particle diameter of the titanium oxides contained in the undercoat layer is therefore preferably in a range of 20 nm to 100 nm.

The average primary particle diameter of the titanium oxides or the titanium oxide surface-treated with anhydrous silicon dioxide and the titanium oxide particles surface-treated with at least hydrous silicon dioxide is determined by measuring and averaging 50 or more particles for the particle diameter based on an SEM (S-4100, product by Hitachi High-Technologies Corporation) photograph.

It is not preferable that the average primary particle diameter is 20 nm or less, because in this case, the dispersibility may be poor to cause aggregation and increased viscosity, leading to lack of stability as a solution.

Besides, it is very difficult to apply a coating solution for undercoat layer formation having increased viscosity to the conductive support, leading to poor productivity.

In addition, it is not preferable that the average primary particle diameter is 100 nm or more, because in this case, the chargeability in micro areas decreases during the formation of the undercoat layer to make generation of black dots likely.

The total content of the titanium oxide particles surface-treated with anhydrous silicon dioxide and the titanium oxide particles surface-treated with at least hydrous silicon dioxide in the undercoat layer is in a range of 10% by weight to 99% by weight, preferably 30% by weight to 99% by weight, and more preferably 35% by weight to 95% by weight.

When the content of the titanium oxides is less than 10% by weight, the sensitivity is reduced, and charges are accumulated in the undercoat layer to increase residual potential. Such a phenomenon is more significant particularly in repetition properties under low-temperature and low-humidity circumstances.

On the other hand, it is not preferable that the content of the titanium oxides is more than 99% by weight, because in this case, aggregates are likely to be generated in the undercoat layer and an image defect is likely to occur.

The powder volume resistance of the titanium oxide particles is preferably $10^5 \Omega$ to $10^{10} \Omega$ cm.

When the powder volume resistance is less than $10^5 \Omega$ cm, the resistance as that of the undercoat layer lowers to cause the undercoat layer to fail in functioning as a charge blocking layer.

For example, the powder volume resistance of inorganic compound particles that have undergone conductive treatment such as formation of a tin oxide conductive layer doped with antimony is as extremely low as $10^0 \Omega$ cm to $10^1 \Omega$ cm. An undercoat layer using such a conductive layer is unusable, because it does not function as an charge blocking layer and deteriorates in chargeability as a characteristic of the photoconductor to generate image fogging and black dots.

On the other hand, it is not preferable that the powder volume resistance of the titanium oxide particles is more than $10^{10} \Omega$ cm, that is, the powder volume resistance of the titanium oxide particles is equal to or larger than the volume resistance of the binder resin, because in this case, the resistance as that of the undercoat layer is so high that transfer of carriers generated upon exposure is inhibited, increasing the residual potential and reducing photosensitivity.

Furthermore, the titanium oxide particles to be used in the present invention are those surface-coated with anhydrous silicon dioxide and those surface-coated with at least hydrous silicon dioxide.

More preferably, the titanium oxide particles to be used in the present invention are those surface-coated with anhydrous silicon dioxide, and those surface-coated with both hydrous silicon dioxide and aluminum hydroxide.

When surface-untreated titanium oxide particles are used, the titanium oxide particles will be likely to aggregate in the case of long-term use or storage of the coating solution for undercoat layer formation because of their micron size, even if the titanium oxide particles are sufficiently dispersed in the coating solution. In this case, such aggregation is unavoidable.

Formation of the undercoat layer with the coating solution for undercoat layer formation containing surface-untreated titanium oxide particles and subjected to long-term storage will therefore lead to generation of a defect and unevenness of the coating film to cause image defects.

In addition, since such a defect in the coating film and uneven coating make charge injection from the conductive support more likely, the chargeability in micro areas will be reduced to generate black dots.

Conventionally, improvement of the dispersibility in the undercoat layer has been attempted by surface-treating titanium oxide particles with alumina. In this case, however, and when the undercoat layer is formed on a dram, which is a conductive support, by a dipping coating process, it was necessary to prepare a large quantity of coating solution. Then, the dispersion process carried out over a long period of time would allow re-aggregation of the titanium oxide to generate black dots, leading to reduced image quality.

It is considered that the alumina used for the surface treatment peeled off due to the dispersion process over a long period of time to lessen the effect of the surface treatment and allow re-aggregation of the titanium oxide, causing an image defect and facilitating charge injection from the conductive support to reduce the chargeability in micro areas of the undercoat layer and generate black dots.

Besides, such black dots will be more significant with long-term use under a high-temperature and high-humidity environment, leading to significantly reduced image quality.

In some other cases, the surface of titanium oxide is coated with a metal oxide having magnetism such as $Fe_2O_3$. This is not preferable because the metal oxide chemically interacts with a phthalocyanine pigment contained in the photosensitive layer to degrade the characteristics of the photoconductor, causing reduced sensitivity and reduced chargeability, in particular.

The present invention can provide an electrophotographic photoconductor that is insusceptible to humidity to produce excellent images free from black dots and image fogging under various environments, and that has improved stability against repeated use by forming an undercoat layer containing both titanium oxide particles surface-coated with anhydrous silicon dioxide and titanium oxide particles surface-coated with at least hydrous silicon dioxide, preferably by forming an undercoat layer containing both titanium oxide particles surface-coated with anhydrous silicon dioxide and titanium oxide particles surface-coated with hydrous silicon dioxide and aluminum hydroxide.

Conventionally, titanium oxide particles surface-coated with only anhydrous silicon dioxide have been used to obtain a photoconductor having better stability. However, when extension of life, which has been desired for recent photoconductors, was attempted for such a photoconductor, the photoconductor experienced sensitivity variation under a high-temperature and high-humidity environment after repeated use for a long period of time.

Meanwhile, in the case of the use of titanium oxide particles surface-coated with only hydrous silicon dioxide, the photoconductor has conventionally deteriorated in the sensitivity under a low-temperature and low-humidity environment, and provided inferior image quality such as a low image density.

In the present invention, furthermore, charge injection from the conductive support can be prevented to obtain an electrophotographic photoconductor having improved image properties free from black dots. In addition, the sensitivity does not vary even in repeated use under low-temperature and low-humidity, and high-temperature and high-humidity environments, and improved image properties free from black dots and image fogging are obtained.

As a photoconductor is used for a long period of time, in particular, paper sheets, a transfer belt, toner, and the like contact with the photosensitive layer to cause abrasion to reduce the film thickness of the photosensitive layer. In this case, environmental variation such as low temperature and low humidity, and high temperature and high humidity, as well as areas having a locally lowered volume resistance due to dielectric breakdown in micro areas and nonuniform film areas in the undercoat layer (for example, aggregates of the metal oxide and impurities locally present in the undercoat layer) cause generation and increase of black dots and image fogging. However, the present invention can provide excellent image properties free from black dots and image fogging even at a limit film thickness (a film thickness of the photoconductor at which the surface potential on the photoconductor no longer changes linearly even when the voltage applied to the charger is changed), which is end of life of the photoconductor.

The film thickness of the undercoat layer is preferably in a range of 0.01 μm to 10 μm, and more preferably in a range of 0.05 μm to 5 μm.

When the film thickness of the undercoat layer is less than 0.01 μm, the film does not substantially function as an undercoat layer, and therefore a uniform surface by covering defects of the conductive support cannot be achieved to fail in preventing carrier injection from the conductive support and cause deterioration in the chargeability.

In addition, it is not preferable that the film thickness of the undercoat layer is more than 10 μm, because in this case, application of the undercoat layer by a dipping coating method is difficult in the production of the photoconductor, and the sensitivity of the photoconductor is reduced.

[Photosensitive Layer 4]

Structures of the photosensitive layer to be formed on the undercoat layer can be categorized as a function separation type (multilayer) photosensitive layer formed of two layers of a charge generation layer 5 and a charge transfer layer 6 or a monolayer photosensitive layer formed of a single layer without separated charge generation and charge transfer layers, and any of them may be used.

Next, the photoconductor of the present invention will be described with reference to the drawings.

Figure 2:
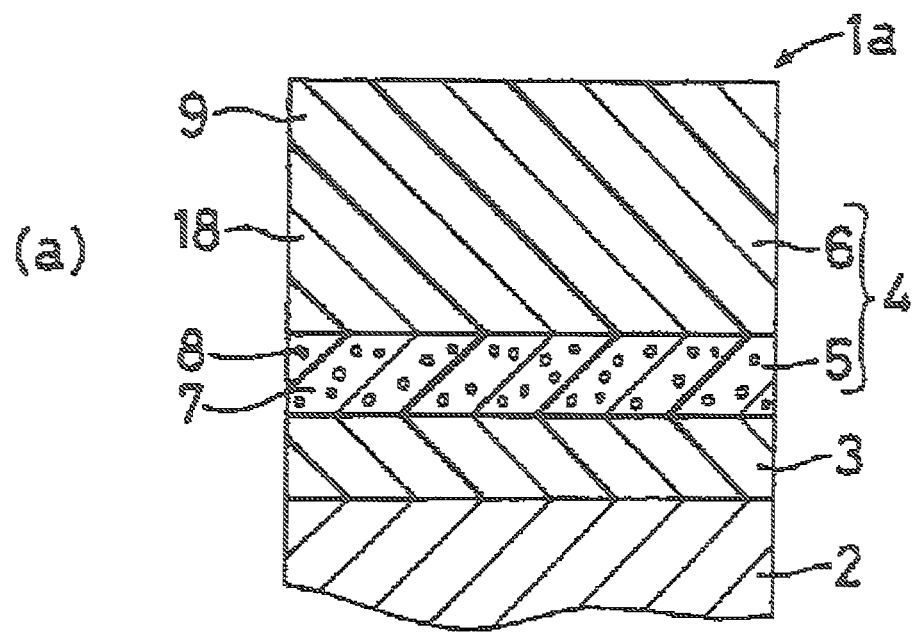
FIG. 2 is sectional views of electrophotographic photoconductors (a) and (b), each of which is an embodiment of the present invention.
Figure 2:
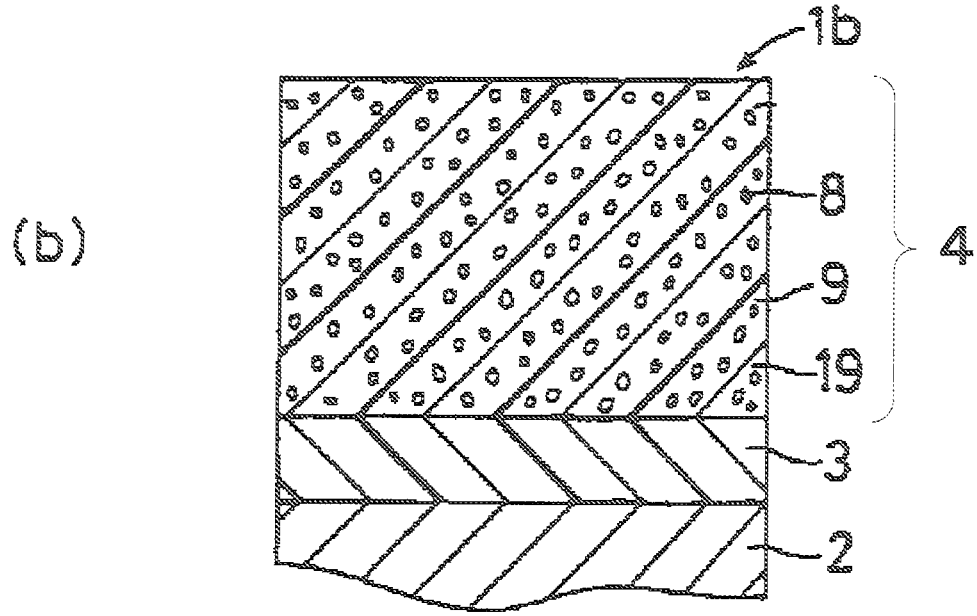

FIG. 2 is schematic sectional views illustrating structures of essential parts of a multilayer type photoconductor (a) and a monolayer type photoconductor (b) of the present invention.

FIG. 2 (*a*) is a schematic sectional view illustrating a structure of an essential part of a multilayer type photoconductor in which the photosensitive layer 4 is a multilayer photosensitive layer (also referred to as "function separation type photosensitive layer") formed by stacking a charge generation layer and a charge transfer layer on the undercoat layer 3 in this order.

FIG. 2 (*b*) is a schematic sectional view illustrating a structure of an essential part of a monolayer type photoconductor in which the photosensitive layer 4 is a monolayer photosensitive layer formed of a single layer stacked on the undercoat layer 3.

In the multilayer photosensitive layer in FIG. 2 (*a*), the charge generation layer 5 and the charge transfer layer 6 may be formed in an inverse order, but a multilayer photosensitive layer in which the two layers are formed in the order illustrated in FIG. 2 (*a*) is preferable.

In a multilayer type photoconductor 1*a* in FIG. 2 (*a*), the undercoat layer 3; and the multilayer photosensitive layer 4 in which the charge generation layer 5 containing a charge generation material 8 and a binder resin 7, and the charge transfer layer 6 containing a charge transfer material 18 and a binder resin 9 are stacked in this order on a surface of the conductive support 2.

In a monolayer type photoconductor 1*b* in FIG. 2 (*b*), the undercoat layer 3; and the monolayer photosensitive layer 4 containing the charge generation material 8, a charge transfer material 19 and the binder resin 9 are formed in this order on a surface of the conductive support 2.

[Photosensitive Layer 4 in Multilayer Type Photoconductor 1*a*]

The photosensitive layer 4 in the multilayer type photoconductor 1*a* is formed of the charge generation layer 5 and the charge transfer layer 6. An optimum material for forming each layer can be independently selected by assigning a charge generation function and a charge transfer function to separate layers.

Hereinafter, the multilayer type photoconductor (FIG. 2 (*a*)) formed by stacking the charge generation layer and the charge transfer layer in this order will be described. However, the description is true of a multilayer type photoconductor of a reverse double layer type except that the stacking order is different.

Here, monolayer structure or multilayer structure, it is preferable for the photosensitive layer that the undercoat layer is a barrier for hole injection from the conductive support, and the photosensitive layer 4 in the multilayer type photoconductor 1*a* and the photosensitive layer 4 in the monolayer type photoconductor 1*b* described below are negatively-charged in order to have high sensitivity and high durability.

[Charge Generation Layer 5]

In the case of the function separation type photosensitive layer, the charge generation layer is formed on the undercoat layer. Known examples of the charge generation material contained in the charge generation layer include bis-azo compounds such as chlorodian blue, polycyclic quinone compounds such as dibromoanthanthrone, perylene compounds, quinacridon compounds, phthalocyanine compounds and azulenium salt compounds. The charge generation material is required to have sensitivity in a long-wavelength region of 620 nm to 800 nm in the electrophotographic photoconductor that performs image formation using a laser beam or an LED as a light source by a reverse developing process.

As the charge generation material to be used for this purpose, phthalocyanine pigments and trisazo pigments have been considered as having high sensitivity and excellent durability. In particular, the phthalocyanine pigments have further excellent characteristics, and one or more kinds of the pigments may be used independently or in combination.

Examples of the usable phthalocyanine pigments include metal-free phthalocyanines and metallophthalocyanines, and mixtures and mixed crystal compounds thereof.

Examples of the metal usable for the metallophthalocyanine pigments include metals being zero in the oxidation state, halides of the metals such as chlorides and bromides, and oxides. Preferable examples of the metal include Cu, Ni, Mg, Pb, V, Pd, Co, Nb, Al, Sn, Zn, Ca, In, Ga, Fe, Ge, Ti and Cr. While various kinds of techniques have been proposed for the production method of these phthalocyanine pigments, any production method may be used. For example, may be used phthalocyanines subjected to various kinds of purification or dispersion process with various kinds of organic solvents for conversion of the crystal type after having been prepared to be pigments.

In the present invention, a phthalocyanine is used as the charge generation material contained in the charge generation layer. Preferably, a τ type metal-free phthalocyanine; a titanylphthalocyanine of a crystal type having a maximum diffraction peak in an X-ray diffraction spectrum at a Bragg angle (2θ±0.2°) of 27.3°; or a titanylphthalocyanine of a crystal type at least having diffraction peaks in an X-ray diffraction spectrum at Bragg angles (2θ±0.2°) of 7.3°, 9.4°, 9.7° and 27.3°, among which the diffraction peaks at 9.4° and 9.7° are both clear branch peaks and greater than the diffraction peak at 27.3°, and the diffraction peak at 9.4° is a maximum diffraction peak is suitably used.

Use of a titanylphthalocyanine of a crystal type having such specific X-ray diffraction peaks provides high sensitivity in long-term use and improved electric characteristics under all environments ranging from high temperature and high humidity to low temperature and low humidity.

The basic structure of the titanylphthalocyanine is represented by the following general formula:

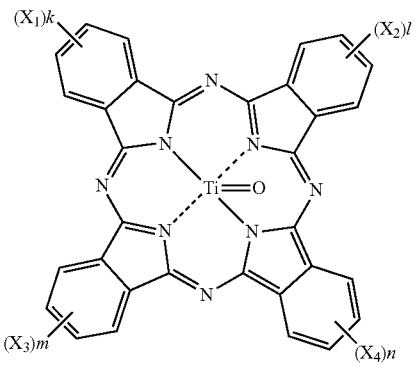

wherein $X_1$ to $X_4$ each represent a halogen atom, a $C_1$-$C_4$ alkyl or alkoxy group, and k, l, m, and n each represent an integer from 0 to 4.

The halogen atom is a fluorine, chlorine, bromine or iodine atom; the $C_1$-$C_4$ alkyl group is a methyl, ethyl, n-propyl, isopropyl, n-butyl, isobutyl or t-butyl group; and the $C_1$-$C_4$ alkoxy group is a methoxy, ethoxy, n-propoxy, isopropoxy, n-butoxy, isobutoxy or t-butoxy group.

The titanylphthalocyanine may be synthesized by any method such as a commonly known method disclosed in "Phthalocyanine Compounds" by Moser and Thomas (Moser, and Thomas. "Phthalocyanine Compounds", Reinhold Publishing Corp., New York, 1963). For example, dichlorotitanium-phthalocyanine can be obtained in good yield by a method by melting and heating o-phthalodinitrile and titanium tetrachloride or heating the same in the presence of an organic solvent such as α-chloronaphthalene. Further, a titanylphthalocyanine can be obtained by hydrolysing the dichlorotitanium-phthalocyanine with a base or water. The resulting titanylphthalocyanine may contain a phthalocyanine derivative in which a hydrogen atom in a benzene ring is substituted with a substituent such as chlorine, fluorine, a nitro group, a cyano group and a sulfone group.

Such a titanylphthalocyanine composition is treated with a water-immiscible organic solvent such as dichloroethane in the presence of water to obtain the crystal type of the present invention.

Non-limiting examples of the method for treating the titanylphthalocyanine with a water-immiscible organic solvent in the presence of water include a method in which the titanylphthalocyanine is swollen with water and treated with the organic solvent, and a method in which water is added into the organic solvent and powders of the titanylphthalocyanine not swollen are put therein.

Non-limiting examples of the method in which the titanylphthalocyanine is swollen with water include a method in which the titanylphthalocyanine is dissolved in sulfuric acid and deposited in water into a form of a wet paste; and a method in which the titanylphthalocyanine is swollen with water and formed into a wet paste using a stirring or dispersing machine such as a homomixer, a paint mixer, a ball mill and a side mill.

In addition, the titanylphthalocyanine composition obtained as a result of the hydrolysis is milled by stirring for a sufficient period of time or application of mechanical stress to obtain the crystal type of the present invention.

Other than general stirring apparatuses, usable examples of the apparatus for this treatment include a homomixer, a paint mixer, a disperser, an AJITER, a ball mill, a side mil, an attritor and an ultrasonic dispersing machine. After the treatment, filtration; washing with methanol, ethanol, water, or the like; and isolation are performed.

The titanylphthalocyanine obtained in such a manner shows excellent characteristics as a charge generation material of an electrophotographic photoconductor. In the present invention, an additional charge generation material may be used together with the above-described titanylphthalocyanine. Examples of the additional charge generation material include α-type, β-type, Y-type and amorphous titanylphthalocyanines, which are different from the titanylphthalocyanine of the present invention in crystal type; other phthalocyanines; azo pigments; anthraquinone pigments; perylene pigments; polycyclic quinone pigments; and squarylium pigments.

Examples of the method for preparing the charge generation layer using these phthalocyanine pigments include a method in which a charge generation material, in particular, a phthalocyanine pigment is vacuum deposited; and a method in which a charge generation material is mixed with a binder resin and an organic solvent, and dispersed therein to form a film, before which the charge generation material may be milled in advance by use of a milling machine. Examples of the milling machine include a ball mill, a sand mill, an attritor, an oscillation mill and an ultrasonic dispersing machine.

In general, a method in which a charge generation material is dispersed in a binder resin solution, and then applied is preferable. Examples of the application method include a spray method, a bar coating method, a roll coating method, a blade method, a ring method and a dipping coating method.

The dipping coating method is a method in which a conductive support is dipped in a coating tank filled with a coating solution and then raised at a constant speed or a sequentially varied speed thereby to form a layer on the conductive support. This method is frequently used in production of photoconductors as being relatively simple and superior in productivity and production cost. The apparatus to be used for the dipping coating method may be provided with a coating solution dispersing machine typified by ultrasonic generators to stabilize the dispersibility of the coating solution.

In particular, the dipping coating method as illustrated in FIG. 1 is relatively simple and advantageous in terms of productivity and costs, and therefore often used for the production of electrophotographic photoconductors. In the dipping coating method, a conductive support is dipped in a coating tank filled with a coating solution for photoconductor formation such as a coating solution for charge generation layer formation, a coating solution for charge transfer layer formation or a coating solution for monolayer photosensitive layer formation, and then raised at a constant rate or a sequentially varied rate to thereby form a photosensitive layer.

In the dipping coating apparatus illustrated in FIG. 1, more specifically, a coating solution tank 13 and a stirring tank 14 contain a coating solution 12. The coating solution 12 passes through a circulation path 17a by the action of a motor 16 to be sent from the stirring tank 14 to the coating solution tank 13, and then passes through a slanted circulation path 17b connecting an upper part of the coating solution tank 13 and an upper part of the stirring tank 14 to be sent from the coating solution tank 13 to the stirring tank 14, and thus circulated.

Above the coating solution tank 13, the conductive support 2 is attached to a rotation axis 10. The axial direction of the rotation axis 10 is along the vertical direction of the coating solution tank 13, and the rotation axis 10 is rotated by the action of a motor 11 so that the support 2 attached thereto moves up and down. The motor 11 is rotated in one predetermined direction so that the support 2 moves down to be dipped in the coating solution 12 in the coating solution tank 13.

Next, the motor 11 is rotated in the other direction reverse to the above-described direction so that the support 2 moves up to be raised out of the coating solution 12 and dried to form a film of the coating solution 12.

In particular, the dipping coating method as illustrated in FIG. 1 is relatively simple and advantageous in terms of productivity and costs, and therefore often used for the production of electrophotographic photoconductors. In the dipping coating method, a conductive support is dipped in a coating tank filled with a coating solution for photoconductor formation, and then raised at a constant rate or a sequentially varied rate to thereby form a photosensitive layer.

Examples of the binder resin usable for the coating solution for photoconductor formation include melamine resins, epoxy resins, silicon resins, polyurethane resins, acrylic resins, polycarbonate resins, polyarylate resins, phenoxy resins, butyral resins, and copolymer resins including two or more types of these repeat units, for example, insulating resins such as vinyl chloride-vinyl acetate copolymer resins and acrylonitrile-styrene copolymer resins. The binder resin is not limited to these resins, and all resins that are generally used may be used independently or in combination of two or more kinds thereof.

Examples of the solvent in which these resins are dissolved include halogenated hydrocarbons such as dichloromethane and dichloroethane; ketones such as acetone, methyl ethyl ketone and cyclohexanone; esters such as ethyl acetate and butyl acetate; ethers such as tetrahydrofuran and dioxane; aromatic hydrocarbons such as benzene, toluene and xylene; and aprotic polar solvents such as N,N-dimethylformamide and N,N-dimethylacetamide, and mixed solvents of these solvents.

Preferably, the phthalocyanine pigment and the binder resin are blended so that the proportion of the phthalocyanine pigment will be in a range of 10% by weight to 99% by weight. When the proportion of the phthalocyanine pigment is less than the lower limit of this range, the sensitivity is reduced. When the proportion of the phthalocyanine pigment is more than the upper limit of this range, the dispersibility is reduced to increase coarse particles, leading to generation of more image defects, in particular, more black dots.

To prepare the coating solution for charge generation layer formation, the phthalocyanine pigment is mixed with the binder resin and the organic solvent, and then dispersed therein. For the dispersion, appropriate conditions may be selected so as to prevent contamination of the solution with impurities generated due to abrasion or the like of the container and the dispersing machine to use.

It is essential that the phthalocyanine pigment contained in the dispersion liquid obtained as described above is dispersed to the extent that the primary particle diameter and/or the aggregation particle diameter will be 3 μm or less.

When the primary particle diameter and/or the aggregated particle diameter are larger than 3 μm, the resulting electrophotographic photoconductor will produce an extraordinary number of black dots on a white background in the case of inverse development. When the coating solution for charge generation layer formation is prepared with various dispersers, therefore, the dispersion conditions are optimized so that the phthalocyanine pigment particles are dispersed to be preferably 3 μm or less in diameter, and more preferably 0.5 μm or less in median diameter and 3 μm or less in mode diameter. Preferably, no particles larger than the above-specified diameters are contained.

Since microparticulation of the phthalocyanine pigment particles requires relatively intensive dispersion conditions and longer dispersion time due to their chemical structure, further dispersion leads to cost inefficiency and makes contamination with impurities due to abrasion of the dispersion medium unavoidable.

In addition, further dispersion leads to change in the crystal type of the phthalocyanine pigment particles caused by the organic solvent and heat during the dispersion or shock by the dispersion to produce an adverse effect such as significant reduction in the sensitivity of the photoconductor. It is therefore not preferable that the phthalocyanine pigment particles are micrified to be 0.01 μm or less in median diameter and 0.1 μm or less in mode diameter.

When the phthalocyanine pigment particles dispersed in the coating solution include particles having a diameter of larger than 3 μm, the primary particles and/or the aggregated particle having a diameter of larger than 3 μm can be removed by performing filtration. As the material of the filter to be used for the filtration, general materials are used as long as they do not swell with or dissolve in the organic solvent to be used in the dispersion, and Teflon (registered trademark) membrane filter having a uniform pore size is preferably used. Further, coarse particles and aggregates may be removed by centrifugal separation.

In the present invention, the charge generation layer to be formed with the coating solution for charge generation layer formation obtained as described above is applied so as to be a film preferably having a thickness of 0.05 μm to 5 μm, and more preferably having a thickness of 0.08 μm to 1 μm.

When the film thickness of the charge generation layer is increased in the conventional structure of the undercoat layer and the photosensitive layer, there was produced an adverse effect, that is, generation of image defects such as fine black dots on a white background generated due to elimination of surface charges in micro areas, while the sensitivity characteristics were improved.

On the other hand, when the film thickness of the undercoat layer is decreased, the sensitivity is reduced. Thus, the practical film thickness that can achieve good balance between reduction of image defects, and improvement in the electric characteristics and the production stability was limited.

However, since use of the undercoat layer containing the metal oxide particles, in particular, titanium oxide particles surface-treated with anhydrous silicon dioxide of the present invention improved the dispersibility in the undercoat layer, generation of aggregates can be prevented and the coating film can be flat and have a uniformly maintained resistance. As a result, it is possible to uniformly maintain microscopic characteristics of the photoconductor, in particular, fluctuation of the sensitivity and the residual potential, and therefore it is possible to inhibit generation of image defects and image fogging even when the film thickness of the charge generation layer is increased. Further, since the film thickness of the charge generation layer can be increased, higher sensitivity can be achieved.

The film thickness of the charge generation layer below the above-mentioned range is not preferable, because it results not only in reduction in the sensitivity but also in change in the crystal type due to the need for the phthalocyanine pigment to be dispersed until their particles become very small.

The film thickness of the charge generation layer above the above-mentioned range is not preferable, either, in terms of costs and difficulty in uniform coating, though it gives certain sensibility.

[Charge Transfer Layer 6]

Typical examples of the method for producing the charge transfer layer to be provided on the charge generation layer include a method in which a coating solution for charge transfer layer formation is prepared by dissolving a charge transfer material in a binder resin solution, and the coating solution is applied to form a film.

Known examples of the charge transfer material to be contained in the charge transfer layer include hydrazone compounds, pyrazoline compounds, triphenylamine compounds, triphenylmethane compounds, stilbene compounds and oxadiazole compounds, which may be used independently or in combination of two or more kinds thereof.

As the binder resin, one or more kinds of the resins mentioned for the charge generation layer may be used independently or in combination. For the production of the charge transfer layer, the same method as for the undercoat layer may be employed.

The film thickness of the charge transfer layer is preferably in a range of 5 µm to 50 µm, and more preferably in a range of 10 µm to 40 µm.

[Photosensitive Layer 4 in Monolayer Type Photoconductor 1b]

The monolayer photosensitive layer contains the charge generation material, the charge transfer material and the binder resin (binding agent) as its major components.

The monolayer photosensitive layer may optionally contain the same additives as those contained in the charge generation layer in such an appropriate amount to the extent that the effect of the present invention is not impaired.

The monolayer photosensitive layer can be formed by dissolving and/or dispersing the charge generation material, the charge transfer material and optional other additives in an appropriate organic solvent to prepare a coating solution for monolayer photosensitive layer formation, applying the coating solution onto a surface of the undercoat layer formed on the conductive support, and then drying the same to remove the organic solvent.

The other steps and conditions therefor are in accordance with those for the formation of the charge generation layer and the charge transfer layer.

Though not particularly limited, the film thickness of the monolayer photosensitive layer is preferably 5 µm to 50 µm, and particularly preferably 10 µm to 40 µm.

When the film thickness of the monolayer photosensitive layer is less than 5 µm, the charge retention ability of the surface of the photoconductor may be reduced. When the film thickness of the monolayer photosensitive layer is more than 50 µm, the productivity may be reduced.

In order to improve the sensitivity, and reduce the residual potential and fatigue due to repeated use, one or more kinds of electron acceptor substances may be added to the photosensitive layer. Examples thereof include quinone compounds such as parabenzoquinone, chloranil, tetrachloro-1,2-benzoquinone, hydroquinone, 2,6-dimethylbenzoquinone, methyl-1,4-benzoquinone, α-naphthoquinone and β-naphthoquinone; nitro compounds such as 2,4,7-trinitro-9-fluorenone, 1,3,6,8-tetranitrocarbazole, p-nitrobenzophenone, 2,4,5,7-tetranitro-9-fluorenone and 2-nitrofluorenone; and cyano compounds such as tetracyanoethylene, 7,7,8,8-tetracyanoquinodimethane, 4-(p-nitrobenzoyloxy)-2',2'-dicyanovinylbenzene and 4-(m-nitrobenzoyloxy)-2',2'-dicyanovinylbenzene.

Out of them, fluorenone compounds, quinone compounds and benzene derivatives having electron attractive substituents such as Cl, CN and $NO_2$ are particularly preferable. Further, the photosensitive layer may contain an ultraviolet absorber and an antioxidant such as benzoic acid; stilbene compounds and their derivatives; and nitrogen-containing compounds such as triazole compounds, imidazole compounds, oxadiazole compounds and thiazole compounds and their derivatives.

[Protective Layer (not Shown)]

The photoconductor of the present invention may have a protective layer (not shown) on a surface of the photosensitive layer 4 in the multilayer type photoconductor 1a or a surface of the photosensitive layer 4 in the monolayer type photoconductor 1b.

The protective layer has a function of improving the abrasive resistance of the photosensitive layer and preventing chemically adverse effects due to ozone and nitrogen oxides.

Further, a protective layer may be provided in order to protect the surface of the photosensitive layer, when needed.

Thermoplastic resins and light or heat curing resins can be used for the surface protective layer. In addition, the surface protective layer may contain an ultraviolet preventive, an antioxidant, an inorganic material such as metal oxides, an organic metal compound and an electron acceptor substance.

The protective layer may be formed, for example, by dissolving or dispersing a binder resin and additives such as an antioxidant and an ultraviolet absorber as needed in an appropriate organic solvent to prepare a coating solution for protective layer formation, and applying the coating solution for protective layer formation onto the surface of the monolayer photosensitive layer or the multilayer photosensitive layer, and then drying the same to remove the organic solvent. Other steps and conditions therefor are in accordance with those in the formation of the charge generation layer.

Though not particularly limited, the film thickness of the protective layer is preferably 0.5 µm to 10 µm, and particularly preferably 1 µm to 5 µm. The film thickness of the protective layer of less than 0.5 µm may lead to poor abrasion resistance in the surface of the photoconductor and insufficient durability. On the other hand, the film thickness of the protective layer of more than 10 µm may decrease the resolution of the photoconductor.

In addition, as needed, the photosensitive layer and the protective layer may be optionally mixed with a plasticizer such as a dibasic acid ester, fatty acid ester, phosphate, phthalate and chlorinated paraffin to make such an improvement in mechanical properties as to impart processability and flexibility or may be blended with a leveling agent such as a silicon resin.

The electrophotographic photoconductor of the present invention can be used for electrophotographic copying machines, and various printers and electrophotographic plate making systems having a lasers or a light emitting diode (LED) as their light sources.

[Image Forming Apparatus 20]

The image forming apparatus 20 of the present invention comprises at least: a photoconductor 21 of the present invention; a charge means for charging the photoconductor; an exposure means for exposing the charged photoconductor to form an electrostatic latent image; a development means for developing the electrostatic latent image formed by the exposure to form a toner image; a transfer means for transferring the toner image formed by the development onto a recording medium; and a fixing means for fixing the transferred toner image onto the recording medium to form an image.

The image forming apparatus of the present invention will be described with reference to the drawings, but the present invention is not limited to the following descriptions.

Figure 3:
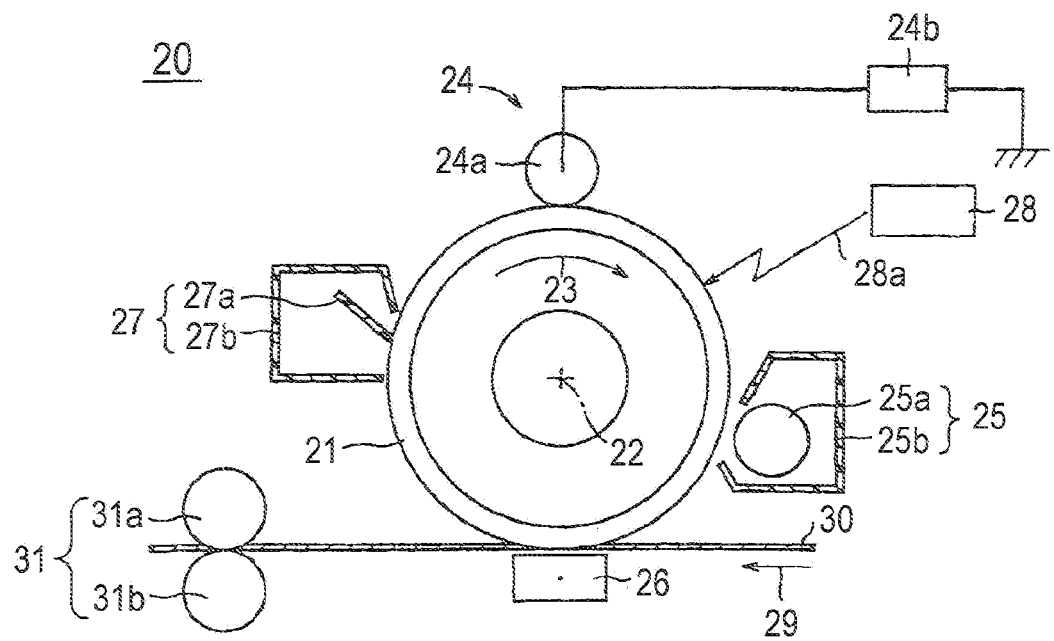
FIG. 3 is a drawing illustrating an example of an image forming apparatus.

FIG. 3 is a schematic side view illustrating a structure of the image forming apparatus of the present invention.

The image forming apparatus 20 in FIG. 3 includes the photoconductor 21 of the present invention (for example, photoconductors 1a and 1b illustrated in FIGS. 2 (a) and 2 (b)), a charging means (charger) 24, an exposure means 28, a developing means (developing unit) 25, a transfer means (transfer unit) 26, a cleaning means (cleaner) 27, a fixing means (fixing unit) 31, and a discharge means (not shown, attached to the cleaning means 27). The reference numeral 30 represents a transfer paper.

The photoconductor 21 is supported in a rotatable manner by a main body, not shown, of the image forming apparatus 20 and driven to rotate in a direction of an arrow 23 around a rotation axis 22 by a drive means, not shown. The drive means has, for example, a structure including an electric motor and reduction gears, and transmits its drive force to the conductive support constituting the core body of the photoconductor 21 thereby to drive the photoconductor 21 to rotate at a predetermined peripheral speed. The charger 24, the exposure means 28, the developing unit 25, the transfer unit 26 and the cleaner 27 are disposed in this order towards a downstream side from an upstream side in the direction of the rotation of the photoconductor 21 as shown by the arrow 23 along the outside peripheral surface of the photoconductor 21.

The charger 24 is a charging means that charges the outside peripheral surface of the photoconductor 21 to a predetermined potential. Specifically, the charger 24 is achieved by, for example, a charge roller 24a of a contact type, a charge brush, or a charger wire such as a corotron or a scorotron. The reference numeral 24b represents a bias power.

The exposure means 28 is provided with, for example, a semiconductor laser as a light source, and applies laser light 28a output from the light source between the charger 24 and the developing unit 25 of the photoconductor 21 to expose the outside peripheral surface of the charged photoconductor 21 according to image information. The light 28a is repeatedly passed for scanning in a main scanning direction, that is, a direction in which the rotation axis 22 of the photoconductor 21 extends, to sequentially form electrostatic latent images on the surface of the photoconductor 21.

The developing unit 25 is a developing means that develops the electrostatic latent image formed by exposure on the surface of the photoconductor 21 with a developer. The developing unit 25 is disposed facing the photoconductor 21 and provided with a developing roller 25a that supplies a toner to the outside peripheral surface of the photoconductor 21 and a case 25b that supports the developing roller 25a in such a manner as to be rotatable around a rotation axis parallel to the rotation axis 22 of the photoconductor 21 and that accommodates the developer containing the toner in its inside space.

The transfer unit 26 is a transfer means for transferring the toner image, which is a visible image formed on the outside peripheral surface of the photoconductor 21 by development, onto the transfer paper 30, which is a recording medium supplied between the photoconductor 21 and the transfer unit 26 from a direction of an arrow 29 by a conveying means, not shown. For example, the transfer unit 26 is a non-contact type transfer means that includes a charge means and transfers a toner image onto the transfer paper 30 by giving the transfer paper 30 charges of a polarity reverse to that of the toner.

The cleaner 27 is a cleaning means that removes and collects toner remaining on the peripheral surface of the photoconductor 21 after the operation of transfer by the transfer unit 26, and it includes a cleaning blade 27a for peeling off the toner remaining on the outside peripheral surface of the photoconductor 21 and a collection case 27b for containing the toner peeled off by the cleaning blade 27a. This cleaner 27 is disposed together with a discharge lamp, not shown.

The image forming apparatus 20 is also provided with the fixing unit 31, which is a fixing means that fixes the transferred image on the downstream side toward which the transfer paper 30 passing between the photoconductor 21 and the transfer unit 26 is conveyed. The fixing unit 31 is provided with a heat roller 31a having a heating means, not shown, and a pressure roller 31b provided opposite the heat roller 31a so as to be pressed by the heat roller 31a to form an abutment.

Operation of image formation by the image forming apparatus 20 is carried out as follows. First, the photoconductor 21 is driven by the driving means to rotate in the direction of the arrow 23, and then the surface of the photoconductor 21 is uniformly charged to a predetermined positive or negative potential by the charger 24 provided at an upstream side of the rotation direction of the photoconductor 21 with respect to an image formation point of the light 28a applied by the exposure means 28.

Then, the surface of the photoconductor 21 is irradiated with the light 28a emitted from the exposure means 28 according to image information. In the photoconductor 21, surface charges of a part irradiated with the light 29a are eliminated by this exposure to make a difference between the surface potential of the part irradiated with the light 28a and the surface potential of the part not irradiated with the light 28a, thereby forming an electrostatic latent image.

Then, the toner is supplied to the surface of the photoconductor 21 on which the electrostatic latent image has been formed, from the developing unit 25 disposed on the downstream side with respect to the image point of the light 28a emitted from the exposure means 28 in the direction of the rotation of the photoconductor 21, to develop the electrostatic latent image, thereby forming a toner image.

In synchronization with the exposure for the photoconductor 21, the transfer paper 30 is fed between the photoconductor 21 and the transfer unit 26. Charges having a polarity opposite to that of the toner are provided to the fed transfer paper 30 by the transfer unit 26 to transfer the toner image formed on the surface of the photoconductor 21 onto the transfer paper 30.

Then, the transfer paper 30 on which the toner image has been transferred is conveyed to the fixing unit 31 by the conveying means, and heated and pressurized when it passes through the abutment between the heat roller 31a and the pressure roller 31b of the fixing unit 31 to fix the toner image to the transfer paper 30, thereby forming a fast image. The transfer paper 30 on which an image is thus formed is discharged out of the image forming apparatus 20 by the conveying means.

Meanwhile, the toner remaining on the surface of the photoconductor 21 even after the transfer of the toner image by the transfer unit 26 is peeled off the surface of the photoconductor 21 and collected by the cleaner 27. The charges on the surface of the photoconductor 21 from which the toner is removed in this manner are eliminated by light emitted from the discharge lamp so that the electrostatic latent image on the surface of the photoconductor 21 disappears. Thereafter, the photoconductor 21 is further driven to rotate, and a series of operations beginning with the charge is repeated again to form images continuously.

Some models of the image forming apparatus may be provided with no cleaning means such as the cleaner 27 for removing and collecting toner remaining on the photoconductor 21 and no discharge means for discharging surface charges remaining on the photoconductor 21.

Hereinafter, examples of the coating solution for undercoat layer formation in the electrophotographic photoconductor and the method for producing the same, the electrophotographic photoconductor, and the image forming apparatus of the present invention will be described in detail based on the drawings. However, the present invention is not limited to the examples.

The surface-treated titanium oxide particles were all heated and dried at a normal pressure at 130° C. for 1 hour in advance of use in the examples described below.

Production Example 1

Production of Titanylphthalocyanine

First, 40 g of o-phthalodinitrile, 18 g of titanium tetrachloride and 500 ml of α-chloronaphthalene were heated and stirred in a nitrogen atmosphere at a temperature of 200° C. to 250° C. for 3 hours to react the reactants and allowed to cool to 100° C. to 130° C., and then the reaction product was filtered off hot, washed with 200 ml of α-chloronaphthalene heated to 100° C. to obtain a crude product of dichlorotitanium-phthalocyanine. At room temperature, the crude product was washed with 200 ml of α-chloronaphthalene, and then washed with 200 ml of methanol, and further subjected to heat spray washing in 500 ml of methanol for 1 hour. After filtered, the resulting crude product was stirred and dissolved in 100 ml of concentrated sulfuric acid to filter off insolubles. The sulfuric acid solution was added to 3000 ml of water, and the resulting crystal was filtered off to be repeatedly subjected to heat spray washing with 500 ml of hot water until the pH thereof reached 6 to 7, and then filtered off again. The wet cake was treated with dichloromethane, washed with methanol, and then dried to obtain 32 g of a titanylphthalocyanine crystal showing an X-ray diffraction spectrum shown in FIG. 4 and having a structure represented by the following formula (I):

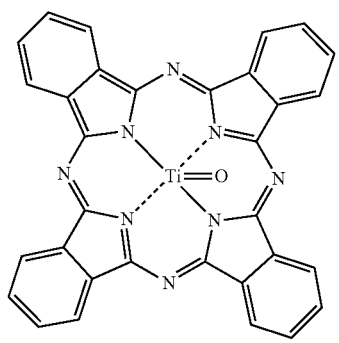

(I)

The X-ray diffraction spectrum of the titanylphthalocyanine crystal was obtained under the following conditions:

| X-ray source | CuKα = 1.54050 Å |
|---|---|
| Voltage | 30 kV |
| Current | 50 mA |

-continued

| X-ray source | CuKα = 1.54050 Å |
|---|---|
| Start angle | 5.0° |
| Stop angle | 35.0° |
| Step angle | 0.01° |
| Measurement time | 1°/minute |
| Measuring method | θ/2θ scan |

Figure 4:
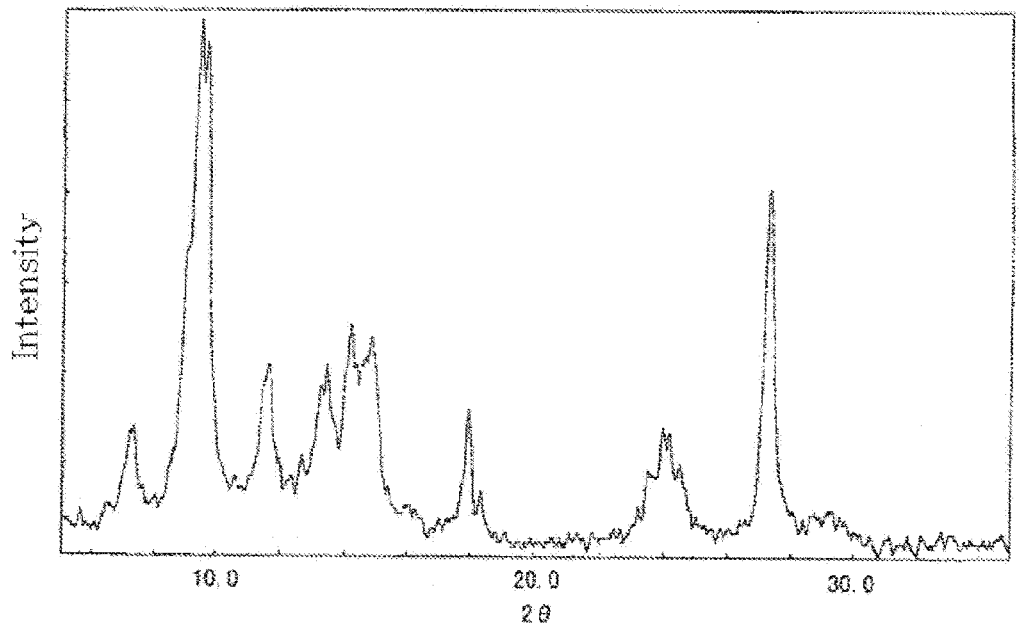
FIG. 4 is an X-ray diffraction spectrum of a titanylphthalocyanine that can be used for the present invention.

The X-ray diffraction spectrum shown in FIG. 4 indicated that the titanylphthalocyanine obtained as described above was a titanylphthalocyanine of a crystal type having a maximum diffraction peak at a Bragg angle (2θ±0.2°) of 9.4° and at least diffraction peaks at Bragg angles (2θ±0.2°) of 7.3°, 9.7° and 27.3°, among which the diffraction peaks at 9.4° and 9.7° are clear branch peaks and greater than the diffraction peak at 27.3°.

Production Example 2

Production of Titanylphthalocyanine

A crude product of dichlorotitanium-phthalocyanine was obtained in the same manner as in Production Example 1, and then at room temperature, the crude product was washed with 200 ml of α-chloronaphthalene, washed with 200 ml of methanol, and further subjected to heat spray washing in 500 ml of methanol for 1 hour. After filtered, the resulting crude product was repeatedly subjected to heat spray washing in 500 ml of water until the pH thereof reached 6 to 7, and then dried to obtain a titanylphthalocyanine crystal (30 g) of a crystal type having a structure represented by the formula (I) and showing an X-ray diffraction spectrum shown in FIG. 5.

Figure 5:
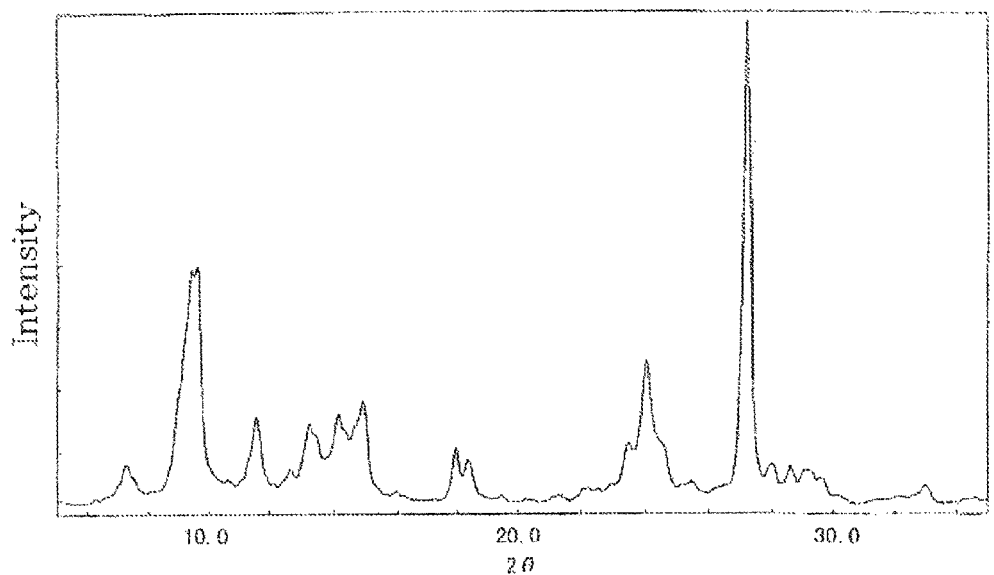
FIG. 5 is an X-ray diffraction spectrum of a titanylphthalocyanine that can be used for the present invention.

As in the case of Production Example 1, the X-ray diffraction spectrum of the crystal shown in FIG. 5 indicated that the titanylphthalocyanine obtained as described above was a titanylphthalocyanine of a crystal type having a maximum diffraction peak at a Bragg angle (2θ±0.2°) of 27.3° and diffraction peaks at Bragg angles (2θ±0.2°) of 7.4°, 9.7° and 27.3°.

Test I

Example 1

FIG. 2 (*b*) is a schematic cross sectional view illustrating an example of the monolayer type electrophotographic photoconductor of the present invention.

As illustrated in FIG. 2 (*b*), the undercoat layer 3 is formed on the conductive support 2, and the photosensitive layer 4 containing the charge generation material 8 and the charge transfer material 19 is formed thereon.

[Coating Solution for Undercoat Layer Formation]

The following components:

| | |
|---|---|
| MAXLIGHT (registered trademark) TS-04 (product by Showa Denko K.K., titanium oxide treated with anhydrous silicon dioxide, titanium oxide: 67% by weight, anhydrous silicon dioxide: 33% by weight, particle diameter of titanium oxide particles: 30 nm, particle diameter of titanium oxide particles treated with anhydrous silicon dioxide: 38 nm) | 0.76 parts by weight |
| Titanium oxide MT-500SA (product by Tayca, titanium oxide treated with hydrous silicon dioxide and aluminum hydroxide, titanium oxide: 90% by weight, Al(OH)$_3$: 5% by weight, SiO$_2$·nH$_2$O: 5% by weight) | 0.19 parts by weight |

-continued

| | |
|---|---|
| Polyamide resin (CM8000, product by Toray Industries, Inc.) | 0.05 parts by weight |
| Methanol | 50 parts by weight |
| 1,3-Dioxolane | 50 parts by weight |
| and zirconia beads having a diameter of 1 mm as a dispersion medium were put into a polypropylene container having a volume of 500 ml in an amount up to half of the volume of the container, and then dispersed with a paint shaker for 20 hours to prepare 100 g of a coating solution for undercoat layer formation. | |

The coating solution for undercoat layer formation was applied onto an aluminum conductive support having a thickness of 100 μm as the conductive support 2 by using a baker applicator and dried with hot air at 110° C. for 10 minutes to form an undercoat layer 3 having a dried film thickness of 0.05 μm.

[Coating Solution for Photosensitive Layer Formation]

Next, on the undercoat layer, the following components:

| | |
|---|---|
| Titanylphthalocyanine obtained in Production Example 1 | 17.1 parts by weight |
| Polycarbonate resin Z-400 (product by Mitsubishi Gas Chemical Company, Inc.) | 17.1 parts by weight |
| Hydrazone compound of the following formula (II) | 17.1 parts by weight |
| Diphenoquinone compound of the following formula (III) | 17.1 parts by weight |
| Tetrahydrofuran | 100 parts by weight |
| were dispersed with a ball mill for 12 hours to prepare 50 g of a coating solution for photosensitive layer formation. Then, the coating solution was applied by using a baker applicator, dried with hot air at 100° C. for 1 hour to form a photosensitive layer 4 having a dried film thickness of 20 μm to produce a monolayer type electrophotographic photoconductor 1b. | |

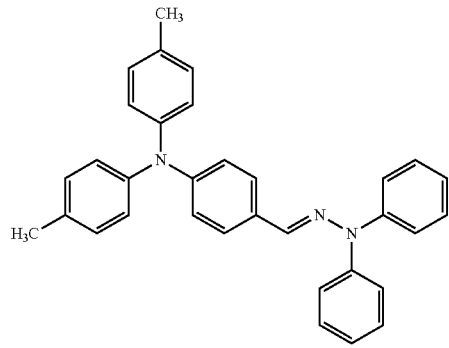

(II)

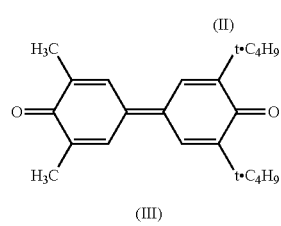

(III)

Example 2

A monolayer type electrophotographic photoconductor 1b was produced in the same manner as in Example 1 except that the content ratio between the titanium oxides and the resin in the coating solution for undercoat layer formation used in Example 1 was changed as follows.

| | |
|---|---|
| MAXLIGHT (registered trademark) TS-04 (product by Showa Denko K.K., titanium oxide treated with anhydrous silicon dioxide, titanium oxide: 67% by weight, anhydrous silicon dioxide: 33% by weight, particle diameter of titanium oxide particles: 30 nm, particle diameter of titanium oxide particles treated with anhydrous silicon dioxide: 38 nm) | 0.08 parts by weight |
| Titanium oxide MT-500SA (product by Tayca, titanium oxide treated with hydrous silicon dioxide and aluminum hydroxide, titanium oxide: 90% by weight, Al(OH)$_3$: 5% by weight, SiO$_2$•nH$_2$O: 5% by weight) | 0.02 parts by weight |
| Polyamide resin (CM8000, product by Toray Industries, Inc.) | 0.9 parts by weight |

Example 3

FIG. 2 (a) is a schematic cross sectional view illustrating an example of a function separation type electrophotographic photoconductor of the present invention. As illustrated in FIG. 2 (a), the undercoat layer 3 is formed on the conductive support 2, and the photosensitive layer 4 including the charge generation layer 5 and the charge transfer layer 6 is stacked thereon. In the structure, the charge generation layer 5 contains the charge generation material 8 and the charge transfer layer 6 contains the charge transfer material 18.

[Coating Solution for Undercoat Layer Formation]

The following components:

| | |
|---|---|
| MAXLIGHT (registered trademark) TS-04 (product by Showa Denko K.K.) | 0.76 parts by weight |
| MT-500SA (product by Tayca) | 0.19 parts by weight |
| Polyamide resin (CM8000, product by Toray Industries, Inc.) | 0.05 parts by weight |
| Methanol | 50 parts by weight |
| 1,3-Dioxolane | 50 parts by weight |
| and zirconia beads having a diameter of 1 mm as a dispersion medium were put into a polypropylene container having a volume of 500 ml in an amount up to half of the volume of the container, and then dispersed by using a paint shaker for 20 hours to prepare 100 g of a coating solution for undercoat layer formation. | |

The coating solution for undercoat layer formation was applied onto an aluminum conductive support having a thickness of 100 μm as the conductive support 2 by using a baker applicator, dried with hot air at 110° C. for 10 minutes to form an undercoat layer 3 having a dried film thickness of 5 μm.

Next, the following components:

| | |
|---|---|
| Titanylphthalocyanine obtained in Production Example 1 | 17.1 parts by weight |
| Vinyl chloride-vinyl acetate-maleic acid copolymer resin SOLBINM (product by Nissin Chemical Industry Co., Ltd) | 2 parts by weight |
| Methyl ethyl ketone | 100 parts by weight |
| were dispersed by using a ball mill for 12 hours to prepare 50 g of a coating solution for charge generation layer formation, and then the coating solution was applied by using a baker applicator and dried with hot air at 120° C. for 10 minutes to form a charge generation layer 5 having a dried film thickness of 0.8 μm. | |

[Coating Solution for Charge Transfer Layer Formation]

Further, the following components:

| | |
|---|---|
| Hydrazone compound of the formula (II) | 8 parts by weight |
| Polycarbonate resin K1300 (product by TEIJIN CHEMICALS LTD.) | 10 parts by weight |
| Silicone oil KF50 (product by Shin-Etsu Chemical Co., Ltd.) | 0.002 parts by weight |
| Dichloromethane | 120 parts by weight | were mixed, stirred and dissolved to prepare 100 g of a coating solution for charge transfer layer formation. The coating solution was applied onto the charge generation layer 5 by using a baker applicator, dried with hot air at 80° C. for 1 hour to form a charge transfer layer 6 having a dried film thickness of 20 μm to produce a function separation type electrophotographic photoconductor 1a.

Example 4

A photosensitive layer was prepared in the same manner as in Example 3 except that the content ratio between the titanium oxides in the coating solution for undercoat layer formation used in Example 3 was changed as follows to produce a function separation type electrophotographic photoconductor 1a.

| | |
|---|---|
| MAXLIGHT (registered trademark) TS-04 (product by Showa Denko K.K.) | 0.475 parts by weight |
| MT-500SA (product by Tayca) | 0.475 parts by weight |

Example 5

A photosensitive layer was prepared in the same manner as in Example 3 except that the content ratio between the titanium oxides in the coating solution for undercoat layer formation used in Example 3 was changed as follows to produce a function separation type electrophotographic photoconductor 1a.

| | |
|---|---|
| MAXLIGHT (registered trademark) TS-04 (product by Showa Denko K.K.) | 0.285 parts by weight |
| MT-500SA (product by Tayca) | 0.665 parts by weight |

Example 6

A photosensitive layer was prepared in the same manner as in Example 3 except that the content ratio between the titanium oxides and the resin in the coating solution for undercoat layer formation used in Example 3 was changed as follows to produce a function separation type electrophotographic photoconductor 1a.

| | |
|---|---|
| MAXLIGHT (registered trademark) TS-04 (product by Showa Denko K.K.) | 0.25 parts by weight |
| MT-500SA (product by Tayca) | 0.25 parts by weight |
| Polyamide resin (CM8000, product by Toray Industries, Inc.) | 0.5 parts by weight |

Example 7

A photosensitive layer was prepared in the same manner as in Example 6 except that the titanium oxides in the coating solution for undercoat layer formation used in Example 6 were changed as follows to produce a function separation type electrophotographic photoconductor 1a.

| | |
|---|---|
| MAXLIGHT (registered trademark) TS-043 (product by Showa Denko K.K., titanium oxide treated with anhydrous silicon dioxide, titanium oxide: 90% by weight, anhydrous silicon dioxide: 10% by weight, particle diameter of titanium oxide: 30 nm, particle diameter of titanium oxide treated with anhydrous silicon dioxide: 32 nm) | 0.25 parts by weight |
| MT-500SA (product by Tayca) | 0.25 parts by weight |

Example 8

A photosensitive layer was prepared in the same manner as in Example 6 except that the titanium oxides in the coating solution for undercoat layer formation used in Example 6 were changed as follows to produce a function separation type electrophotographic photoconductor 1a.

| | |
|---|---|
| MAXLIGHT (registered trademark) TS-01 (product by Showa Denko K.K., titanium oxide treated with anhydrous silicon dioxide, titanium oxide: 67% by weight, anhydrous silicon dioxide: 33% by weight, particle diameter of titanium oxide particles: 90 nm, particle diameter of titanium oxide particles treated with anhydrous silicon dioxide: 110 nm) | 0.25 parts by weight |
| MT-500SA (product by Tayca) | 0.25 parts by weight |

Example 9

An undercoat layer and a photosensitive layer were prepared in the same manner as in Example 7 except that the titanylphthalocyanine obtained in Production Example 1 in the coating solution for charge generation layer formation used in Example 7 was changed to the titanylphthalocyanine obtained in Production Example 2 to produce a function separation type electrophotographic photoconductor 1a.

Example 10

An undercoat layer and a photosensitive layer were prepared in the same manner as in Example 7 except that the titanylphthalocyanine obtained in Production Example 1 in the coating solution for charge generation layer formation used in Example 7 was changed to a τ type metal-free phthalocyanine, Liophoton TPA-891 (product by Toyo Ink Mfg. Co., Ltd.) to produce a function separation type electrophotographic photoconductor 1a.

Example 11

A photosensitive layer was prepared in the same manner as in Example 3 except that the content ratio between the titanium oxides and the resin in the coating solution for undercoat layer formation used in Example 3 was changed as follows to produce a function separation type electrophotographic photoconductor 1a.

| | |
|---|---|
| MAXLIGHT (registered trademark) TS-04 (product by Showa Denko K.K.) | 0.64 parts by weight |
| MT-500SA (product by Tayca) | 0.16 parts by weight |
| Polyamide resin (CM8000, product by Toray Industries, Inc.) | 0.2 parts by weight |

Example 12

An undercoat layer and a photosensitive layer were prepared in the same manner as in Example 11 except that the titanylphthalocyanine obtained in Production Example 1 in the coating solution for charge generation layer formation used in Example 11 was changed to the titanylphthalocyanine obtained in Production Example 2 to produce a function separation type electrophotographic photoconductor 1a.

Example 13

A photosensitive layer was prepared in the same manner as in Example 11 except that the titanium oxides in the coating solution for undercoat layer formation used in Example 11 were changed as follows to produce a function separation type electrophotographic photoconductor 1a.

| | |
|---|---|
| MAXLIGHT (registered trademark) TS-04 (product by Showa Denko K.K.) | 0.24 parts by weight |
| MT-500SA (product by Tayca) | 0.56 parts by weight |

Example 14

An undercoat layer and a photosensitive layer were prepared in the same manner as in Example 13 except that the titanylphthalocyanine obtained in Production Example 1 in the coating solution for charge generation layer formation used in Example 13 was changed to the titanylphthalocyanine obtained in Production Example 2 to produce a function separation type electrophotographic photoconductor 1a.

Comparative Example 1

An undercoat layer was prepared in the same manner as in Example 3 except that the components of the coating solution for undercoat layer formation used in Example 3 were changed to the following components, and then a photosensitive layer is prepared in the same manner as in Example 3 to produce a function separation type electrophotographic photoconductor 1a:

| | |
|---|---|
| MT-500SA (product by Tayca) | 0.95 parts by weight |
| Polyamide resin (CM8000, product by Toray Industries, Inc.) | 0.05 parts by weight |
| Methanol | 50 parts by weight |
| 1,3-Dioxolane | 50 parts by weight |

Comparative Example 2

An undercoat layer was prepared in the same manner as in Example 3 except that the components of the coating solution for undercoat layer formation used in Example 3 were changed to the following components, and then a photosensitive layer is prepared in the same manner as in Example 3 to produce a function separation type electrophotographic photoconductor 1a:

| | |
|---|---|
| MAXLIGHT (registered trademark) TS-04 (product by Showa Denko K.K.) | 0.95 parts by weight |
| Polyamide resin (CM8000, product by Toray Industries, Inc.) | 0.05 parts by weight |
| Methanol | 50 parts by weight |
| 1,3-Dioxolane | 50 parts by weight |

Comparative Example 3

An undercoat layer was prepared in the same manner as in Example 3 except that the components of the coating solution for undercoat layer formation used in Example 3 were changed to the following components, and then a photosensitive layer is prepared in the same manner as in Example 3 to produce a function separation type electrophotographic photoconductor 1a:

| | |
|---|---|
| MAXLIGHT (registered trademark) TS-043 (product by Showa Denko K.K.) | 0.95 parts by weight |
| Polyamide resin (CM8000, product by Toray Industries, Inc.) | 0.05 parts by weight |
| Methanol | 50 parts by weight |
| 1,3-Dioxolane | 50 parts by weight |

Comparative Example 4

An undercoat layer was prepared in the same manner as in Example 3 except that the components of the coating solution for undercoat layer formation used in Example 3 were changed to the following components, and then a photosensitive layer is prepared in the same manner as in Example 3 to produce a function separation type electrophotographic photoconductor 1a:

| | |
|---|---|
| MAXLIGHT (registered trademark) TS-01 (product by Showa Denko K.K.) | 0.95 parts by weight |
| Polyamide resin (CM8000, product by Toray Industries, Inc.) | 0.05 parts by weight |
| Methanol | 50 parts by weight |
| 1,3-Dioxolane | 50 parts by weight |

Comparative Example 5

An undercoat layer was prepared in the same manner as in Example 3 except that the components of the coating solution for undercoat layer formation used in Example 3 were changed to the following components, and then a photosensitive layer is prepared in the same manner as in Example 3 to produce a function separation type electrophotographic photoconductor 1a:

| | |
|---|---|
| MAXLIGHT (registered trademark) TS-043 (product by Showa Denko K.K.) | 0.855 parts by weight |
| MT-500SA (product by Tayca) | 0.095 parts by weight |

-continued

| | |
|---|---|
| Polyamide resin (CM8000, product by Toray Industries, Inc.) | 0.05 parts by weight |
| Methanol | 50 parts by weight |
| 1,3-Dioxolane | 50 parts by weight |

Comparative Example 6

An undercoat layer was prepared in the same manner as in Example 3 except that the components of the coating solution for undercoat layer formation used in Example 3 were changed to the following components, and then a photosensitive layer is prepared in the same manner as in Example 3 to produce a function separation type electrophotographic photoconductor 1a:

| | |
|---|---|
| MAXLIGHT (registered trademark) TS-043 (product by Showa Denko K.K.) | 0.19 parts by weight |
| MT-500SA (product by Tayca) | 0.76 parts by weight |
| Polyamide resin (CM8000, product by Toray Industries, Inc.) | 0.05 parts by weight |
| Methanol | 50 parts by weight |
| 1,3-Dioxolane | 50 parts by weight |

Example 15

An undercoat layer was formed in the same manner as in Example 1, and then a photosensitive layer 4 having a dried film thickness of 16 μm was formed in the same manner as in Example 1 to produce a monolayer type electrophotographic photoconductor 1b.

Example 16

An undercoat layer was formed in the same manner as in Example 2, and then a photosensitive layer 4 having a dried film thickness of 16 μm was formed in the same manner as in Example 2 to produce a monolayer type electrophotographic photoconductor 1b.

Example 17

An undercoat layer was formed in the same manner as in Example 3, and then a charge generation layer was formed and a charge transfer layer 6 having a dried film thickness 16 μm was formed thereon in the same manner as in Example 3 to produce a function separation type electrophotographic photoconductor 1a.

Example 18

An undercoat layer was formed in the same manner as in Example 4, and then a charge generation layer was formed and a charge transfer layer 6 having a dried film thickness 16 μm was formed thereon in the same manner as in Example 4 to produce a function separation type electrophotographic photoconductor 1a.

Example 19

An undercoat layer was formed in the same manner as in Example 5, and then a charge generation layer was formed and a charge transfer layer 6 having a dried film thickness 16 μm was formed thereon in the same manner as in Example 5 to produce a function separation type electrophotographic photoconductor 1a.

Example 20

An undercoat layer was formed in the same manner as in Example 6, and then a charge generation layer was formed and a charge transfer layer 6 having a dried film thickness 16 μm was formed thereon in the same manner as in Example 6 to produce a function separation type electrophotographic photoconductor 1a.

Example 21

An undercoat layer was formed in the same manner as in Example 7, and then a charge generation layer was formed and a charge transfer layer 6 having a dried film thickness 16 μm was formed thereon in the same manner as in Example 7 to produce a function separation type electrophotographic photoconductor 1a.

Example 22

An undercoat layer was formed in the same manner as in Example 8, and then a charge generation layer was formed and a charge transfer layer 6 having a dried film thickness 16 μm was formed thereon in the same manner as in Example 8 to produce a function separation type electrophotographic photoconductor 1a.

Example 23

An undercoat layer was formed in the same manner as in Example 9, and then a charge generation layer was formed and a charge transfer layer 6 having a dried film thickness 16 μm was formed thereon in the same manner as in Example 9 to produce a function separation type electrophotographic photoconductor 1a.

Example 24

An undercoat layer was formed in the same manner as in Example 10, and then a charge generation layer was formed and a charge transfer layer 6 having a dried film thickness 16 μm was formed thereon in the same manner as in Example 10 to produce a function separation type electrophotographic photoconductor 1a.

Example 25

An undercoat layer was formed in the same manner as in Example 11, and then a charge generation layer was formed and a charge transfer layer 6 having a dried film thickness 16 μm was formed thereon in the same manner as in Example 11 to produce a function separation type electrophotographic photoconductor 1a.

Example 26

An undercoat layer was formed in the same manner as in Example 12, and then a charge generation layer was formed and a charge transfer layer 6 having a dried film thickness 16 μm was formed thereon in the same manner as in Example 12 to produce a function separation type electrophotographic photoconductor 1a.

Example 27

An undercoat layer was formed in the same manner as in Example 13, and then a charge generation layer was formed and a charge transfer layer 6 having a dried film thickness 16 μm was formed thereon in the same manner as in Example 13 to produce a function separation type electrophotographic photoconductor 1a.

Example 28

An undercoat layer was formed in the same manner as in Example 14, and then a charge generation layer was formed and a charge transfer layer 6 having a dried film thickness 16 μm was formed thereon in the same manner as in Example 14 to produce a function separation type electrophotographic photoconductor 1a.

Comparative Example 7

An undercoat layer was formed in the same manner as in Comparative Example 1, and then a charge generation layer was formed and a charge transfer layer 6 having a dried film thickness 16 μm was formed thereon in the same manner as in Comparative Example 1 to produce a function separation type electrophotographic photoconductor 1a.

Comparative Example 8

An undercoat layer was formed in the same manner as in Comparative Example 2, and then a charge generation layer was formed and a charge transfer layer 6 having a dried film thickness 16 μm was formed thereon in the same manner as in Comparative Example 2 to produce a function separation type electrophotographic photoconductor 1a.

Comparative Example 9

An undercoat layer was formed in the same manner as in Comparative Example 3, and then a charge generation layer was formed and a charge transfer layer 6 having a dried film thickness 16 μm was formed thereon in the same manner as in Comparative Example 3 to produce a function separation type electrophotographic photoconductor 1a.

Comparative Example 10

An undercoat layer was formed in the same manner as in Comparative Example 4, and then a charge generation layer was formed and a charge transfer layer 6 having a dried film thickness 16 μm was formed, thereon in the same manner as in Comparative Example 4 to produce a function separation type electrophotographic photoconductor 1a.

Comparative Example 11

An undercoat layer was formed in the same manner as in Comparative Example 5, and then a charge generation layer was formed and a charge transfer layer 6 having a dried film thickness 16 μm was formed thereon in the same manner as in Comparative Example 5 to produce a function separation type electrophotographic photoconductor 1a.

Comparative Example 12

An undercoat layer was formed in the same manner as in Comparative Example 6, and then a charge generation layer was formed and a charge transfer layer 6 having a dried film thickness 16 μm was formed thereon in the same manner as in Comparative Example 6 to produce a function separation type electrophotographic photoconductor 1a.

The photoconductors produced by using the undercoat layers and the photosensitive layers prepared in Examples 1 to 28 and Comparative Examples 1 to 12 as described above were each put around an aluminum drum of a machine obtained by modifying a digital copying machine (AR-451M, product by Sharp Kabushiki kaisha), and white solid images were printed by an inverse development process to be respectively evaluated according to the following evaluation method.

[Evaluation of White Solid Images]

White solid images were printed by using a digital copying machine equipped with each of the photoconductors produced in Example 1 to 28 and Comparative Examples 1 to 12 to evaluate initial white solid images under a high-temperature/high-humidity environment (35° C./85%) according to the following evaluation criteria. The initial white solid images were evaluated at a grid bias of 850, which is 200 higher than a value in normal use, while keeping the difference between the grid bias and the DV bias constant.

VG (very good): No defect of black dots observed.
G (good): Some defects of black dots observed.
B (bad): Many defects of black dots observed.
VB (very bad): Image fogging observed.

The following table shows the evaluation results.

TABLE 1

| Example | Initial white solid image | Example | Initial white solid image |
|---|---|---|---|
| Example 1 | G | Example 15 | G |
| Example 2 | G | Example 16 | G |
| Example 3 | VG | Example 17 | VG |
| Example 4 | VG | Example 18 | VG |
| Example 5 | VG | Example 19 | VG |
| Example 6 | VG | Example 20 | VG |
| Example 7 | VG | Example 21 | VG |
| Example 8 | VG | Example 22 | VG |
| Example 9 | VG | Example 23 | VG |
| Example 10 | VG | Example 24 | VG |
| Example 11 | VG | Example 25 | VG |
| Example 12 | VG | Example 26 | VG |
| Example 13 | VG | Example 27 | VG |
| Example 14 | VG | Example 28 | VG |
| Comparative Example 1 | VG | Comparative Example 7 | VB |
| Comparative Example 2 | VG | Comparative Example 8 | B |
| Comparative Example 3 | VG | Comparative Example 9 | B |
| Comparative Example 4 | VG | Comparative Example 10 | B |
| Comparative Example 5 | VG | Comparative Example 11 | B |
| Comparative Example 6 | VG | Comparative Example 12 | VB |

The results of the evaluation of initial white solid images indicate that no defect or some negligible defects were observed and satisfactory images posing no problem for normal use were obtained in the printed matters produced by the digital copying machine equipped with the photoconductors obtained in Examples 1 to 28. On the other hand, satisfactory images were obtained in the case of the photoconductors having a larger film thickness in Comparative Examples 1 to 6, but image fogging and many defects of black dots were observed in the printed matters produced by using the photoconductors having a smaller film thickness in Comparative Examples 7 to 12 (photoconductors having a limit film thickness: a film thickness at which the surface potential on the photoconductor no longer changes linearly even when the voltage applied to the charger is changed).

When in the digital copying machine used for the evaluation and at a normal grid bias of the charger, the film thickness of the photoconductors in Examples 15 to 28 and Comparative Examples 7 to 12 showed chargeability comparable to the photoconductors in Examples 1 to 14 and Comparative Examples 1 to 6.

[Evaluation of Dispersion Stability]

In addition, the obtained coating solutions for undercoat layer formation were allowed to stand for one month and six months to be examined for presence of aggregates as evaluation of dispersion stability.

G (good): No aggregate observed.

NB (not bad): Some aggregates observed, but usable in normal operation.

B (bad): Aggregate sedimentation observed, unusable.

The following table shows the evaluation results.

TABLE 2

| Example | One month | Six month |
|---|---|---|
| Example 1 | G | NB |
| Example 2 | G | NB |
| Example 3 | G | NB |
| Example 4 | G | NB |
| Example 5 | G | NB |
| Example 6 | G | G |
| Example 7 | G | G |
| Example 8 | G | G |
| Example 9 | G | G |
| Example 10 | G | G |
| Example 11 | G | G |
| Example 12 | G | G |
| Example 13 | G | G |
| Example 14 | G | G |
| Comparative Example 1 | G | B |
| Comparative Example 2 | G | B |
| Comparative Example 3 | G | B |
| Comparative Example 4 | G | B |
| Comparative Example 5 | G | B |
| Comparative Example 6 | G | B |

The dispersion stability was compared among the coating solutions for undercoat layer formation. In Examples 1 to 14 and Comparative Examples 1 to 6, no aggregate was observed after one month. In Examples 1 to 5, however, some aggregates were observed after six months, which were to pose no problem for practical use. In Comparative Examples 1 to 6, more aggregates than Examples 1 to 5 were observed to indicate that the coating solutions for undercoat layer formation have poor dispersion stability.

Example 29

Silicon nitride beads as a dispersion medium having a diameter of 0.5 mm were put into a horizontal bead mil having a volume of 16500 mL in an amount up to 80% of the volume of the bead mill, and then the following components were stored in a stirring tank and sent to the disperser through a diaphram pump to be dispersed under circulation for 15 hours to prepare 3000 g of a coating solution for undercoat layer formation:

| | |
|---|---|
| MAXLIGHT (registered trademark) TS-043 (product by Showa Denko K.K.) | 4 parts by weight |
| MT-500SA (product by Tayca) | 4 parts by weight |
| Polyamide resin (X1010, product by Daicel-Degussa Ltd.) | 2 parts by weight |
| Ethanol | 50 parts by weight |
| Tetrahydrofuran | 50 parts by weight |

An undercoat layer having a film thickness of 0.05 μm was formed on a cylindrical aluminum support having a diameter of 30 mm and a total length of 345 mm as a conductive support by a dipping coating method with a coating vessel filled with this coating solution.

Then, a mixture of the following components:

| | |
|---|---|
| Titanylphthalocyanine obtained in Production Example 1 | 2 parts by weight |
| Polyvinyl butyral resin (S-LEC BM-S, product by SEKISUI CHEMICAL CO., LTD.) | 2 parts by weight |
| Methyl ethyl ketone | 100 parts by weight | was dispersed by using a ball mill for 12 hours to prepare 2000 g of a coating solution for charge generation layer formation. Then, this coating solution was applied onto the undercoat layer by the same method as in the case of the undercoat layer and dried with hot air at 120° C. for 10 minutes to form a charge generation layer 5 having a dried film thickness of 0.8 μm.

Subsequently, the following components:

| | |
|---|---|
| Enamine compound represented by the formula (IV) | 10 parts by weight |
| Polycarbonate resin (Z200, product by Mitsubishi Engineering-Plastics Corporation) | 10 parts by weight |
| Silicone oil KF50 (product by Shin-Etsu Chemical Co., Ltd.) | 0.02 parts by weight |
| Tetrahydrofuran | 120 parts by weight | were mixed and dissolved to prepare 3000 g of a coating solution for charge transfer layer formation, and then the coating solution was applied onto the charge generation layer by the same method as in the case of the undercoat layer and dried at 110° C. for 1 hour to form a charge transfer layer having a film thickness of 23 μm. Thus, a sample function separation type electrophotographic photoconductor was produced.

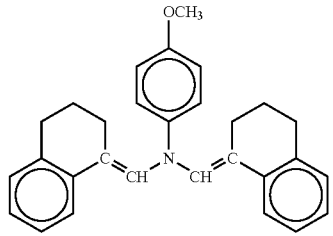

(IV)

Example 30

A coating solution for undercoat layer formation in an amount of 3000 g was prepared in the same manner as in Example 29 except that the components of the coating solution for undercoat layer formation used in Example 29 were changed to the following components:

| | |
|---|---|
| MAXLIGHT (registered trademark) TS-043 (product by Showa Denko K.K.) | 4 parts by weight |
| MT-500SA (product by Tayca) | 4 parts by weight |
| Polyamide resin (M1276, product by Arkema) | 2 parts by weight |
| Methanol | 50 parts by weight |
| Tetrahydrofuran | 50 parts by weight |

An undercoat layer having a film thickness of 1.0 μm was formed on a cylindrical aluminum support having a diameter of 30 mm and a total length of 345 mm as a conductive support by a dipping coating method with a coating vessel filled with this coating solution.

Next, a charge generation layer and a charge transfer layer were formed in sequence in the same manner as in Example 29 to produce a sample function separation type electrophotographic photoconductor.

Comparative Example 13

A coating solution for undercoat layer formation in an amount of 3000 g was prepared in the same manner as in Example 29 except that the components of the coating solution for undercoat layer formation used in Example 29 were changed to the following components:

| | |
|---|---|
| MAXLIGHT (registered trademark) TS-043 (product by Showa Denko K.K.) | 8 parts by weight |
| Polyamide resin (M1276, product by Arkema) | 2 parts by weight |
| Methanol | 50 parts by weight |
| Tetrahydrofuran | 50 parts by weight |

An undercoat layer was formed with the coating solution for undercoat layer formation in the same manner as in Example 29, and then a charge generation layer and a charge transfer layer were formed in sequence to produce a sample function separation type electrophotographic photoconductor.

Comparative Example 14

A coating solution for undercoat layer formation in an amount of 3000 g was prepared in the same manner as in Example 29 except that the components of the coating solution for undercoat layer formation used in Example 29 were changed to the following components:

| | |
|---|---|
| MT-500SA (product by Tayca) | 8 parts by weight |
| Polyamide resin (M1276, product by Arkema) | 2 parts by weight |
| Methanol | 50 parts by weight |
| Tetrahydrofuran | 50 parts by weight |

An undercoat layer was formed with the coating solution for undercoat layer formation in the same manner as in Example 29, and then a charge generation layer and a charge transfer layer were formed in sequence to produce a sample function separation type electrophotographic photoconductor.

The sample electrophotographic photoconductors produced as described above were set in a digital copying machine (AR-451M, product by Sharp Kabushiki kaisha) and measured for the initial charge potential $V_0$ under a normal temperature/normal humidify (N/N, 22° C./65%) environment, the initial bright potential $V_L$ after laser exposure, the initial bright potential $V_L$ under a low temperature/low humidity (L/L, 5° C./10%) environment and the initial bright potential $V_L$ under a high temperature/high humidity (H/H, 35° C./85%) environment as an electric characteristics stability test.

Here, $V_0$ means a surface potential of a photoconductor immediately after the charge operation by the charger when laser exposure was not given, and $V_L$ means a surface potential of a photoconductor immediately after laser exposure.

In addition, image properties of an initial stage and after aging by actual copying of 50000 sheets (50 k sheets) and 100000 sheets (100 k sheets) were examined as a durability test.

VG (very good): No defect of black dots observed.
G (good): Some defects of black dots observed.
B (bad): Many defects of black dots observed.
VB (very bad): Image fogging observed.

The following table shows the results.

TABLE 3

| | N/N-potential characteristics | | Image evaluation | | |
|---|---|---|---|---|---|
| | $V_0$ (V) | $V_L$ (V) | Initial stage | After 50k actual copying | After 100k actual copying |
| Example 29 | −652 | −103 | VG | VG | VG |
| Example 30 | −650 | −105 | VG | VG | VG |
| Comparative Example 13 | −651 | −102 | VG | VG | B |
| Comparative Example 14 | −650 | −103 | VG | VG | B |

TABLE 4

| | L/L-potential characteristics | | Image evaluation | | |
|---|---|---|---|---|---|
| | $V_0$ (V) | $V_L$ (V) | Initial stage | After 50k actual copying | After 100k actual copying |
| Example 29 | −653 | −110 | VG | VG | VG |
| Example 30 | −652 | −113 | VG | VG | VG |
| Comparative Example 13 | −652 | −109 | VG | VG | B |
| Comparative Example 14 | −651 | −206 | VB | VB | VB |

TABLE 5

| | H/H-potential characteristics | | Image evaluation | | |
|---|---|---|---|---|---|
| | $V_0$ (V) | $V_L$ (V) | Initial stage | After 50k actual copying | After 100k actual copying |
| Example 29 | −650 | −93 | VG | VG | VG |
| Example 30 | −651 | −95 | VG | VG | VG |
| Comparative Example 13 | −650 | −98 | VG | VG | B |
| Comparative Example 14 | −650 | −102 | VG | VG | B |

The results of Examples 29 and 30 in the tables indicate that the potential was very stable, showing the $V_L$ hardly varying not only under the N/N (normal temperature/normal humidity) environment but also with environmental variation.

Here, no fogging or defect of black dots were observed in the image evaluation to confirm that the image quality was excellent.

In Comparative Example 14, on the other hand, the potential $V_L$ was high from the initial stage and the sensitivity was poor to generate fogging under the L/L environment.

Here, defects of black dots were observed in the aging by long-term actual copying. In Comparative Example 13, better image properties were obtained, but defects of black dots were observed in the aging by actual copying over a very long term.

That is, it has been indicated that the photoconductors obtained in Comparative Examples 13 and 14 are not suitable for practical use, because the $V_L$ rises as the environment varies, and images degrade by the time of 100K-sheet copying due to long-term use.

INDUSTRIAL APPLICABILITY

The present invention can provide a photoconductor having high sensitivity even in long-term use and superior electric characteristics under all environments ranging from a low-temperature and low-humidity environment to a high-temperature and high-humidity environment, and an image forming apparatus exerting superior image properties free from image defects by using a photosensitive layer provided with an undercoat layer containing a binder resin, and both titanium oxide particles surface-treated with anhydrous silicon dioxide and titanium oxide particles surface-treated with at least hydrous silicon dioxide.

What is claimed is:

1. An electrophotographic photoconductor comprising a conductive support, an undercoat layer and a photosensitive layer, the undercoat layer and the photosensitive layer being formed on the conductive support in sequence, wherein the undercoat layer contains a binder resin, titanium oxide particles surface-treated with at least anhydrous silicon dioxide and titanium oxide particles surface-treated with at least hydrous silicon dioxide.

2. The photoconductor according to claim 1, wherein the titanium oxide particles surface-treated with anhydrous silicon dioxide and the titanium oxide particles surface-treated with hydrous silicon dioxide are contained at a ratio by weight of 80/20 to 30/70.

3. The photoconductor according to claim 1, wherein the titanium oxide particles surface-treated with hydrous silicon dioxide are titanium oxide particles surface-treated with hydrous silicon dioxide and aluminum hydroxide.

4. The photoconductor according to claim 1, wherein the titanium oxide particles surface-treated with hydrous silicon dioxide are those surface-treated with a mixture of hydrous silicon dioxide and aluminum hydroxide mixed at a ratio by weight of 10/90 to 90/10.

5. The photoconductor according to claim 1, wherein the photosensitive layer contains a phthalocyanine as a charge generation material.

6. The photoconductor according to claim 1, wherein the photosensitive layer contains, as a charge generation material, a phthalocyanine selected from a τ type metal-free phthalocyanine; a titanylphthalocyanine of a crystal type having a maximum diffraction peak in an X-ray diffraction spectrum at a Bragg angle (2θ±0.2°) of 27.3° and a titanylphthalocyanine of a crystal type at least having diffraction peaks in an X-ray diffraction spectrum at Bragg angles (2θ±0.2°) of 7.3°, 9.4°, 9.7° and 27.3°, among which the diffraction peaks at 9.4° and 9.7° are both clear branch peaks and greater than the diffraction peak at 27.3°, and the diffraction peak at 9.4° is a maximum diffraction peak.

7. The photoconductor according to claim 1, wherein the titanium oxide particles have an average primary particle diameter of 20 nm to 100 nm.

8. The photoconductor according to claim 1, wherein the titanium oxide particles are contained in the undercoat layer at a ratio by weight of 10/90 to 95/5 with respect to the binder resin.

9. The photoconductor according to claim 1, wherein the binder resin is a polyamide resin.

10. The photoconductor according to claim 1, wherein the undercoat layer has a film thickness of 0.05 μm to 5 μm.

11. The photoconductor according to claim 1, wherein the photosensitive layer is a multilayer photosensitive layer comprising a charge generation layer and a charge transfer layer, the charge generation layer having a film thickness of 0.05 μm to 5 μm.

12. An image forming apparatus including the electrographic photoconductor according to claim 1.

13. An image forming method comprising using the image forming apparatus according to claim 12.

* * * * *